United States Patent
Wu et al.

(10) Patent No.: US 12,028,468 B2
(45) Date of Patent: Jul. 2, 2024

(54) MIDDLE FRAME, BATTERY COVER, AND ELECTRONIC DEVICE

(71) Applicant: HUAWEI TECHNOLOGIES CO., LTD., Guangdong (CN)

(72) Inventors: Guoping Wu, Shenzhen (CN); Feng Xu, Shenzhen (CN); Siwei Wang, Shenzhen (CN); Dezhi Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 17/627,316

(22) PCT Filed: Jul. 17, 2020

(86) PCT No.: PCT/CN2020/102673
§ 371 (c)(1),
(2) Date: Jan. 14, 2022

(87) PCT Pub. No.: WO2021/008608
PCT Pub. Date: Jan. 21, 2021

(65) Prior Publication Data
US 2022/0345552 A1   Oct. 27, 2022

(30) Foreign Application Priority Data

Jul. 17, 2019 (CN) .......................... 201910646543.3
Aug. 15, 2019 (CN) .......................... 201910754876.8

(51) Int. Cl.
*H04M 1/02* (2006.01)
*B32B 9/00* (2006.01)
(Continued)

(52) U.S. Cl.
CPC ............ *H04M 1/0262* (2013.01); *B32B 9/005* (2013.01); *B32B 9/045* (2013.01); *H01M 50/247* (2021.01);
(Continued)

(58) Field of Classification Search
CPC .. H04M 1/0262; H04M 1/026; H04M 1/0202; H04M 1/02; B32B 9/005;
(Continued)

(56) References Cited

U.S. PATENT DOCUMENTS

2014/0125535 A1* 5/2014 Ramachandran ........ H01Q 9/30
343/745
2014/0306857 A1* 10/2014 Bevelacqua ............. H01Q 7/00
343/750

(Continued)

FOREIGN PATENT DOCUMENTS

CN       2922311 Y     7/2007
CN    104253884 A    12/2014
(Continued)

*Primary Examiner* — Andrew Wendell
(74) *Attorney, Agent, or Firm* — HUAWEI TECHNOLOGIES CO., LTD.

(57) ABSTRACT

Embodiments of this application provide a middle frame, a battery cover, and an electronic device. The electronic device may include a mobile or fixed terminal with an edge frame or a housing, such as a mobile phone, a tablet computer, a notebook computer, an ultra-mobile personal computer (UMPC), a handheld computer, a walkie-talkie, a netbook, a POS machine, a personal digital assistant (PDA), an event data recorder, a wearable device, a virtual reality device, a wireless USB flash drive, a Bluetooth speaker/headset, or a vehicle-mounted device. Two types of materials: ceramics and plastic, are used to form a middle frame and a battery cover, thereby reducing a weight of the electronic device. This resolves a problem that is of a relatively large weight of an existing electronic device and (Continued)

that is caused when a pure ceramic middle frame and a pure ceramic battery cover are used in the electronic device.

20 Claims, 12 Drawing Sheets

(51) Int. Cl.
| | |
|---|---|
| *B32B 9/04* | (2006.01) |
| *H01M 50/247* | (2021.01) |
| *H01M 50/282* | (2021.01) |
| *H01Q 1/24* | (2006.01) |
| *H04B 1/03* | (2006.01) |
| *H04B 1/08* | (2006.01) |

(52) U.S. Cl.
CPC .......... *H01M 50/282* (2021.01); *H01Q 1/243* (2013.01); *B32B 2457/10* (2013.01); *H01M 2220/30* (2013.01)

(58) Field of Classification Search
CPC .. B32B 9/045; B32B 2457/10; H01M 50/247; H01M 50/282; H01M 2220/30; H01M 50/209; H01M 50/222; H01M 50/227; H01M 50/229; H01M 50/231; H01M 50/233; H01M 50/24; H01Q 1/243; H01Q 1/405; H01Q 1/44; H01Q 5/307; H01Q 9/42; H01Q 21/28; H01Q 1/36; H01Q 1/48; H01Q 1/50; H01Q 21/00; H01Q 21/30; Y02E 60/10; H04B 1/03; H04B 1/08

See application file for complete search history.

(56) References Cited

U.S. PATENT DOCUMENTS

| | | |
|---|---|---|
| 2015/0003028 A1 | 1/2015 | Chiang et al. |
| 2015/0245513 A1 | 8/2015 | Moon |
| 2016/0339679 A1 | 11/2016 | Yoon et al. |
| 2024/0052524 A1* | 2/2024 | Lozano .................. D04H 1/728 |

FOREIGN PATENT DOCUMENTS

| | | |
|---|---|---|
| CN | 105141721 A | 12/2015 |
| CN | 206294439 U | 6/2017 |
| CN | 107186860 A | 9/2017 |
| CN | 109216874 A | 1/2019 |
| CN | 109719502 A | 5/2019 |
| CN | 110505325 A | 11/2019 |
| CN | 210958415 U | 7/2020 |
| JP | 2000512118 A | 9/2000 |
| JP | 2004343684 A | 12/2004 |
| JP | 2011527105 A | 10/2011 |
| JP | 2013093002 A | 5/2013 |
| JP | 2014113726 A | 6/2014 |
| JP | 2016208383 A | 12/2016 |
| KR | 20140068411 A | 6/2014 |

* cited by examiner

MIDDLE FRAME, BATTERY COVER, AND ELECTRONIC DEVICE

CROSS-REFERENCE TO RELATED APPLICATIONS

This application is a National Stage of International Application No. PCT/CN2020/102673, filed on Jul. 17, 2020, which claims priority to Chinese Patent Application No. 201910646543.3, filed on Jul. 17, 2019 and Chinese Patent Application No. 201910754876.8, filed on Aug. 15, 2019. All of the aforementioned applications are hereby incorporated by reference in their entireties.

TECHNICAL FIELD

This application relates to the field of terminal technologies, and in particular, to a middle frame, a battery cover, and an electronic device.

BACKGROUND

Due to a good-looking appearance, jade-like gloss, and a smooth touch feeling of ceramics, electronic devices, for example, a mobile phone and a tablet computer, to which the ceramics are applied have been gradually sought after and loved by consumers. In addition, the ceramics have high hardness and wear resistance. When being used as an outer housing of the mobile phone, the ceramics will not be scratched or worn, to ensure that the mobile phone is durable. The ceramics are not only environmental-friendly, but also of high ornamental value.

Currently, when a ceramic material is applied to the mobile phone, a ceramic rear cover or a ceramic middle frame is mainly made of the ceramic material. However, because the ceramics are relatively heavy, a weight of the entire mobile phone is increased. When a thickness of the ceramic rear cover or a thickness of the ceramic middle frame is reduced to reduce the weight of the entire mobile phone, a strength of the ceramic rear cover or a strength of the ceramic middle frame cannot meet a requirement. Therefore, when the ceramic rear cover or the ceramic middle frame is used, how to reduce the weight of the mobile phone while a strength requirement is met is an urgent problem that needs to be resolved in the industry.

SUMMARY

Embodiments of this application provide a middle frame, a battery cover, and an electronic device. This realizes that a thickness of a ceramic frame and a thickness of a ceramic outer housing are reduced while the middle frame and the battery cover meet a strength requirement, and reduces a weight of the electronic device.

A first aspect of an embodiment of this application provides a middle frame, including a metal middle plate and an edge frame disposed around an outer edge of the metal middle plate. The edge frame includes a plastic frame and a gapless ceramic frame disposed around an outer side surface of the plastic frame, and the gapless ceramic frame is connected to the metal middle plate through the plastic frame.

The edge frame includes the plastic frame and the ceramic frame. In this way, on one hand, a thickness of the ceramic frame can be reduced, so that it can realize that a weight of an electronic device is reduced; and on the other hand, because an inner side of the edge frame is the plastic frame, the plastic frame can provide strength support for the ceramic frame. In this way, the edge frame meets a strength requirement based on the thickness of the ceramic frame being reduced. In addition, because the inner side of the edge frame is the plastic frame, a complex internal structure design is easily made on the plastic frame. This avoids a problem that it is difficult to make the internal structure design on the ceramic frame with relatively high hardness. In the embodiments of this application, because an outer side of an edge frame of the electronic device is the ceramic frame, this meets both a high-quality feeling and high hardness of the edge frame of the electronic device.

In a possible implementation, a surface that is of the gapless ceramic frame and that faces the plastic frame has a protrusion structure, and the plastic frame has a recessed structure that fits the protrusion structure.

In this way, on one hand, a surface area of a side that is of the ceramic frame and that faces the plastic frame is increased, and during injection molding, an engaging area between the ceramic frame and the plastic frame is increased. Therefore, a binding force between the ceramic frame and the plastic frame is increased, and a pulling force between the ceramic frame and the plastic frame is increased, so that it is difficult to crack between the ceramic frame and the plastic frame. On the other hand, the protrusion structure is disposed on an inner side of the ceramic frame. In this way, when the ceramic frame and the plastic frame are combined to form the edge frame, the protrusion structure can enhance a strength of the edge frame.

In a possible implementation, the gapless ceramic frame is of a gapless square ring structure, and a thickness of a side wall at a corner of the gapless ceramic frame is greater than a thickness of a side wall at a non-corner part of the gapless ceramic frame.

In this way, it can be ensured that a strength of the corner of the ceramic frame is relatively high, and when the electronic device drops, four corners of the electronic device are not easily damaged.

In a possible implementation, the middle frame further includes at least one antenna. The antenna includes an antenna radiator, and a feeding point and a grounding point that are electrically connected to the antenna radiator, and the antenna radiator is disposed between the plastic frame and the gapless ceramic frame.

In this way, the antenna radiator is located between the ceramic frame and the plastic frame, so that the antenna radiator is carried inside the edge frame of the middle frame, and the antenna radiator is hidden between the ceramic frame and the plastic frame. In this way, the antenna radiator is invisible on the middle frame.

In a possible implementation, a clearance of the antenna is less than 10 mm. In this way, interference that is caused by metal around the antenna to the antenna is reduced, and radiation efficiency of the antenna is ensured.

In a possible implementation, impedance of the antenna is less than or equal to 5 SI In this way, the antenna has a higher conductivity and a stronger radiation capability.

In a possible implementation, a ceramic strength of the gapless ceramic frame is 300-1700 MPa, and a ceramic fracture toughness is 2-16 MPa·m1/2. In this way, the ceramic frame meets the required strength requirement and meets a test requirement.

In a possible implementation, a plastic bending modulus of the plastic frame is greater than or equal to 1000 MPa. In this way, the plastic frame supports the ceramic frame, so that the thickness of the ceramic frame can be reduced.

In a possible implementation, a material of the gapless ceramic frame includes zirconia ceramics, silicon carbide ceramics, silicon nitride ceramics, aluminum nitride ceramics, or aluminum oxide ceramics.

In a possible implementation, a material of the plastic frame includes polycarbonate (PC), plastic alloy, polyamide (PA), and polybutylene terephthalate (PBT).

In a possible implementation, a reinforcing material is added in the material of the plastic frame, and the reinforcing material includes one or more of glass fiber, carbon fiber, and graphene. A strength of the plastic frame is increased through the reinforcing material.

In a possible implementation, a surface that is of the gapless ceramic frame and that backs towards the plastic frame is an arc-shaped surface protruding outwards, or the surface that is of the gapless ceramic frame and that backs towards the plastic frame is a vertical surface.

The surface that is of the ceramic frame and that faces outwards is the arc-shaped surface protruding outwards. In this way, on one hand, it is convenient for a user to hold the ceramic frame of the electronic device; and on the other hand, the ceramic frame has a more good-looking appearance, and the ceramic frame is lighter than a pure ceramic frame of a same thickness.

In a possible implementation, the plastic frame is formed between the gapless ceramic frame and the metal middle plate through injection molding, and the gapless ceramic frame is connected to the metal middle plate through the plastic frame.

When plastic injection molding is used, on one hand, the plastic frame may be formed on an inner side surface of the ceramic frame in an injection molding process; and on the other hand, the ceramic frame is connected to the metal middle plate in the injection molding process. Therefore, the ceramic frame, the metal middle plate, and the plastic frame form an integral structure in the injection molding process.

A second aspect of an embodiment of this application provides an electronic device, including at least a display screen, a rear cover, and any middle frame provided in the first aspect. The display screen and the rear cover are respectively located on two sides of the middle frame.

The foregoing middle frame is included, so that a weight of the electronic device is reduced.

A third aspect of an embodiment of this application provides a middle frame, including:

a metal middle plate and an edge frame disposed around an outer edge of the metal middle plate.

The edge frame includes a plastic frame and a ceramic frame disposed on an outer side surface of the plastic frame.

The middle frame further includes at least one antenna. The antenna includes an antenna radiator, and a feeding point and a grounding point that are electrically connected to the antenna radiator, and the antenna radiator is disposed between the plastic frame and the ceramic frame.

The edge frame includes the plastic frame and the ceramic frame. On one hand, a thickness of the ceramic frame can be reduced, so that it can realize that a weight of the middle frame is reduced. On the other hand, because an inner side of the edge frame is the plastic frame, the plastic frame can provide strength support for the ceramic frame, so that the edge frame meets a strength requirement based on the thickness of the ceramic frame being reduced. In addition, because the inner side of the edge frame is the plastic frame, a complex internal structure design is easily made on the plastic frame. This avoids a problem that it is difficult to make the internal structure design on the ceramic frame with relatively high hardness. An outer side of the edge frame of the middle frame is the ceramic frame, and this also meets a high-quality feeling and high hardness of an edge frame of an electronic device. The antenna radiator is disposed between the plastic frame and the ceramic frame, so that the antenna radiator is carried inside the edge frame of the middle frame, and the antenna radiator is hidden between the ceramic frame and the plastic frame. In this way, the antenna radiator is invisible on the middle frame.

In a possible implementation, a clearance of the antenna is less than 10 mm. In this way, interference that is caused by metal around the antenna to the antenna is reduced, and radiation efficiency of the antenna is ensured.

In a possible implementation, impedance of the antenna is less than or equal to 5 SI In this way, the antenna has a higher conductivity and a stronger radiation capability.

In a possible implementation, there are a plurality of antennas, and antenna radiators of the plurality of antennas are spaced between the ceramic frame and the plastic frame.

In a possible implementation, the plurality of antennas include at least one or more of a primary antenna, a diversity antenna, a Wi-Fi antenna, a GPS antenna, a MIMO antenna, and a Bluetooth antenna.

In a possible implementation, the ceramic frame is a gapless ceramic frame; or the ceramic frame includes a plurality of ceramic sub-frames, and the plurality of ceramic sub-frames are connected to form the ceramic frame in a ring shape.

A fourth aspect of an embodiment of this application provides an electronic device, including at least a display screen, a rear cover, and any middle frame described in the third aspect. The display screen and the rear cover are respectively located on two sides of the middle frame.

A fifth aspect of an embodiment of this application provides a battery cover, including a ceramic outer housing and a plastic inner housing. The plastic inner housing is disposed on an inner surface of the ceramic outer housing The battery cover includes the ceramic outer housing and the plastic inner housing. In this way, on one hand, a weight of the battery cover is reduced, so that a weight of an electronic device is reduced; and on the other hand, it realizes that a complex internal structure design is easily made on the plastic inner housing. This avoids a problem that it is difficult to make the internal structure design on the ceramic outer housing with relatively high hardness.

In a possible implementation, the battery cover includes a bottom cover and a side cover, and the side cover is disposed around an outer edge of the bottom cover.

The battery cover includes the bottom cover and the side cover, and the side cover may be used as an outer frame of the electronic device. In this way, when the battery cover is used in the electronic device, both the outer frame of the electronic device and an outer surface of the bottom cover are made of a ceramic material. In this way, an all-ceramic arrangement on an outer surface of the electronic device is realized based on the weight of the battery cover being reduced.

In a possible implementation, the ceramic outer housing includes an outer bottom housing and an outer side housing disposed around an outer edge of the outer bottom housing.

The plastic inner housing includes an inner bottom housing and an inner side housing, the outer bottom housing and the inner bottom housing form the bottom cover, and the outer side housing and the inner side housing form the side cover. In this way, an entire outer side surface and an entire outer bottom surface of the battery cover are made of the ceramic material, and an entire inner side surface and an entire inner bottom surface of the battery cover are made of a plastic material.

In a possible implementation, a thickness of the bottom cover of the battery cover is 0.45-0.9 mm.

A thickness of the outer bottom housing of the ceramic outer housing is 0.2-0.6 mm. In this way, the thickness of the outer bottom housing of the ceramic outer housing is reduced, and the weight of the battery cover is reduced in comparison with that of a pure ceramic housing.

In a possible implementation, the middle frame further includes at least one antenna. The antenna includes an antenna radiator, and a feeding point and a grounding point that are electrically connected to the antenna radiator, and the antenna radiator is disposed between the ceramic outer housing and the plastic inner housing.

The antenna radiator is located between the ceramic outer housing and the plastic inner housing, so that the antenna radiator is carried inside the battery cover. The antenna radiator is hidden between the ceramic outer housing and the plastic inner housing. In this way, the antenna radiator is invisible on the battery cover.

In a possible implementation, the antenna radiator is located between the outer bottom housing of the ceramic outer housing and the inner bottom housing of the plastic inner housing, or the antenna radiator is located between the outer side housing of the ceramic outer housing and the inner side housing of the plastic inner housing.

In a possible implementation, the plastic inner housing is formed on the inner surface of the ceramic outer housing through plastic injection molding. In this way, in an injection molding process, on one hand, the plastic inner housing is formed, and on the other hand, a combination of the ceramic outer housing and the plastic inner housing is implemented.

In a possible implementation, a ceramic strength of the ceramic outer housing is 300-1700 MPa, and a ceramic fracture toughness is 2-16 MPa·m1/2.

In a possible implementation, a plastic bending modulus of the plastic inner housing is greater than or equal to 1000 MPa.

In a possible implementation, a material of the ceramic outer housing includes zirconia ceramics, silicon carbide ceramics, silicon nitride ceramics, aluminum nitride ceramics, or aluminum oxide ceramics, and a material of the plastic inner housing includes polycarbonate (PC), plastic alloy, polyamide (PA), and polybutylene terephthalate (PBT).

In a possible implementation, a reinforcing material is added in the material of the plastic inner housing, and the reinforcing material includes one or more of glass fiber, carbon fiber, and graphene.

A sixth aspect of an embodiment of this application provides an electronic device, including at least a display screen and any battery cover described above. The display screen is connected to the battery cover to enclose accommodation space used to accommodate a component.

The battery cover includes a ceramic outer housing and a plastic inner housing. In this way, on one hand, a weight of the battery cover is reduced, so that a weight of the electronic device is reduced; and on the other hand, it realizes that a complex internal structure design is easily made on the plastic inner housing. This avoids a problem that it is difficult to make the internal structure design on the ceramic outer housing with relatively high hardness.

A seventh aspect of an embodiment of this application provides a middle frame manufacturing method, and the method includes:

providing a metal middle plate and a ceramic frame; and placing the metal middle plate and the ceramic frame in a mold for plastic injection molding to form a middle frame. The middle frame includes the metal middle plate and an edge frame disposed around an outer edge of the metal middle plate. The edge frame includes the ceramic frame and a plastic frame that is injection molded inside the ceramic frame and that is connected to the metal middle plate.

The metal middle plate and the ceramic frame are placed in the mold for the plastic injection molding. In this way, on one hand, the plastic frame is formed in an injection molding process, and on the other hand, a connection between the ceramic frame and the metal middle plate is implemented in the injection molding process. Therefore, the middle frame including the ceramic frame, the plastic frame, and the metal middle plate is an integral structure.

In a possible implementation, before the placing the metal middle plate and the ceramic frame in a mold for plastic injection molding, the method further includes:

forming a protrusion structure on an inner side surface of the ceramic frame; and forming a side wall a part of the outer edge of the metal middle plate, forming a notch structure on a part of the outer edge of the metal middle plate, or forming a side wall and a notch structure on a part of the outer edge of the metal middle plate.

In this way, in the injection molding process, a contact area between the plastic frame and the ceramic frame is increased through the protrusion structure. Therefore, a formed binding force between the plastic frame and the ceramic frame is greater.

In a possible implementation, before the placing the metal middle plate and the ceramic frame in a mold for plastic injection molding, the method further includes:

disposing at least one antenna radiator on the inner side surface of the ceramic frame. In this way, in the injection molding process, the antenna radiator is injection molded between the ceramic frame and the plastic frame. Therefore, the antenna radiator is disposed inside the edge frame.

In a possible implementation, after the placing the metal middle plate and the ceramic frame in a mold for plastic injection molding to form a middle frame, the method further includes:

performing inner cavity refined processing on the middle frame;

performing outline processing on the ceramic frame of the middle frame on which the inner cavity refined processing is performed; and performing, on the ceramic frame on which the outline processing is performed, rough polishing, side hole processing, fine polishing, and surface treatment.

In this way, on one hand, the middle frame has a more good-looking structure, and on the other hand, the surface treatment is performed on the ceramic frame, for example, a coating layer is plated on a surface of the ceramic frame, and the coating layer may be an anti-fingerprint (AF) film. The coating layer makes it difficult to leave a fingerprint on a ceramic surface, and makes the ceramic surface have good wear resistance.

An eighth aspect of an embodiment of this application provides a battery cover manufacturing method, and the method includes:

providing a ceramic outer housing; and placing the ceramic outer housing in a mold for plastic injection molding to form a battery cover. The battery cover includes the ceramic outer housing and a plastic inner housing injection molded on an inner surface of the ceramic outer housing.

The ceramic outer housing is placed in the mold for the plastic injection molding. In this way, in an injection molding process, on one hand, a plastic frame is formed on the inner surface of the ceramic outer housing, and on the other hand, a connection between the ceramic outer housing and the plastic inner housing is implemented in the injection molding process.

In a possible implementation, before the placing the ceramic outer housing in a mold for plastic injection molding, the method further includes:

forming a protrusion structure on the inner surface of the ceramic outer housing.

The protrusion structure is formed on the inner surface of the ceramic outer housing. In this way, in the injection molding process, a contact area between the plastic frame and a ceramic frame is increased. Therefore, a formed binding force between the plastic inner housing and the ceramic outer housing is greater.

In a possible implementation, before the placing the ceramic outer housing in a mold for plastic injection molding, the method further includes:

forming at least one antenna radiator on the inner surface of the ceramic outer housing. In this way, in the injection molding process, it realizes that the antenna radiator is injection molded between the ceramic outer housing and the plastic inner housing, so that the antenna radiator is invisible on the battery cover.

In a possible implementation, after the placing the ceramic outer housing in a mold for plastic injection molding to form a battery cover, the method further includes:

performing inner cavity refined processing on the battery cover;

performing outline processing on the ceramic outer housing of the battery cover on which the inner cavity refined processing is performed; and performing, on the ceramic outer housing on which the outline processing is performed, rough polishing, side hole processing, fine polishing, and surface treatment.

In this way, on one hand, a good-looking appearance of the battery cover is realized, and on the other hand, an anti-fingerprint (AF) film may be formed in a surface treatment process. The coating layer makes it difficult to leave a fingerprint on a ceramic surface, and makes the ceramic surface have good wear resistance.

Figure 1:
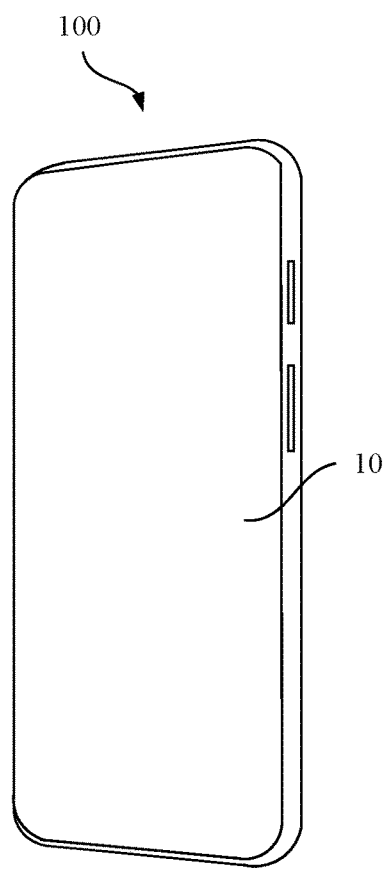
FIG. 1 is a schematic diagram of a three-dimensional structure of an electronic device according to an embodiment of this application.

DESCRIPTION OF REFERENCE SIGNS 100 and 200: Mobile phones; 10 and 210: Display screens; 20: Middle frame; 21: Metal middle plate; 211: Metal side wall; 22: Edge frame;

221: Ceramic frame; 2211: First ceramic sub-frame; 2212: Second ceramic sub-frame; 2213: Third ceramic sub-frame;

2214: Fourth ceramic sub-frame; 2215: Fifth ceramic sub-frame; 2216: Sixth ceramic sub-frame;

2217: Seventh ceramic sub-frame; 2218: Eighth ceramic sub-frame; 221a: Protrusion structure; 222: Plastic frame;

30 and 230: Circuit boards; 40 and 240: Batteries; 50: Rear cover; 61: First antenna radiator; 62: Second antenna radiator;

63: Third antenna radiator; 64: Fourth antenna radiator; 65: Fifth antenna radiator; 66: Sixth antenna radiator;

601: First antenna; 602: Second antenna; 603: Third antenna; 604: Fourth antenna; 605: Fifth antenna;

606: Sixth antenna; A1, A2, A3, A4, A5, A6, b1, b2, b3, b4, b5, and b6: Corners;

a1: First feeding point; a2: Second feeding point; a3: Third feeding point; a4: Fourth feeding point; a5: Fifth feeding point;

a6: Sixth feeding point; B1: First feed; B2: Second feed; B3: Third feed; B4: Fourth feed;

B5: Fifth feed; B6: Sixth feed; c1: First grounding point; c2: Second grounding point; c3: Third grounding point;

c4: Fourth grounding point; c5: Fifth grounding point; c6: Sixth grounding point; 220: Middle plate; 250: Battery cover;

251: Ceramic outer housing; 2511: Outer side housing; 2512: Outer bottom housing; 252: Plastic inner housing; 2521: Inner side housing;

2522: Inner bottom housing; and 260: Antenna radiator.

DESCRIPTION OF EMBODIMENTS

Some terms used in embodiments of this application are used to merely explain the embodiments of this application, with no intention to limit this application. The following describes implementations in the embodiments of this application in detail with reference to accompanying drawings.

An embodiment of this application provides an electronic device, including but not limited to a mobile or fixed terminal with an edge frame or a housing, such as a mobile phone, a tablet computer, a notebook computer, an ultra-mobile personal computer (ultra-mobile personal computer, UMPC), a handheld computer, a walkie-talkie, a netbook, a POS machine, a personal digital assistant (personal digital assistant, PDA), an event data recorder, a wearable device, a virtual reality device, a wireless USB flash drive, a Bluetooth speaker/headset, or a vehicle-mounted front-mounted device.

In this embodiment of this application, an example in which a mobile phone 100 is the electronic device is used for description. A scenario in which edge frames of a middle frame of the mobile phone 100 use a ceramic frame and a plastic frame is set to a scenario 1. A scenario in which an antenna radiator is disposed between the ceramic frame and the plastic frame of the mobile phone 100 is set to a scenario 2. A scenario in which a battery cover of the mobile phone 100 uses a ceramic outer housing and a plastic inner housing is set to a scenario 3.

The following separately describes structures of the mobile phone 100 in the scenario 1, the scenario 2, and the scenario 3.

Scenario 1

Figure 2:
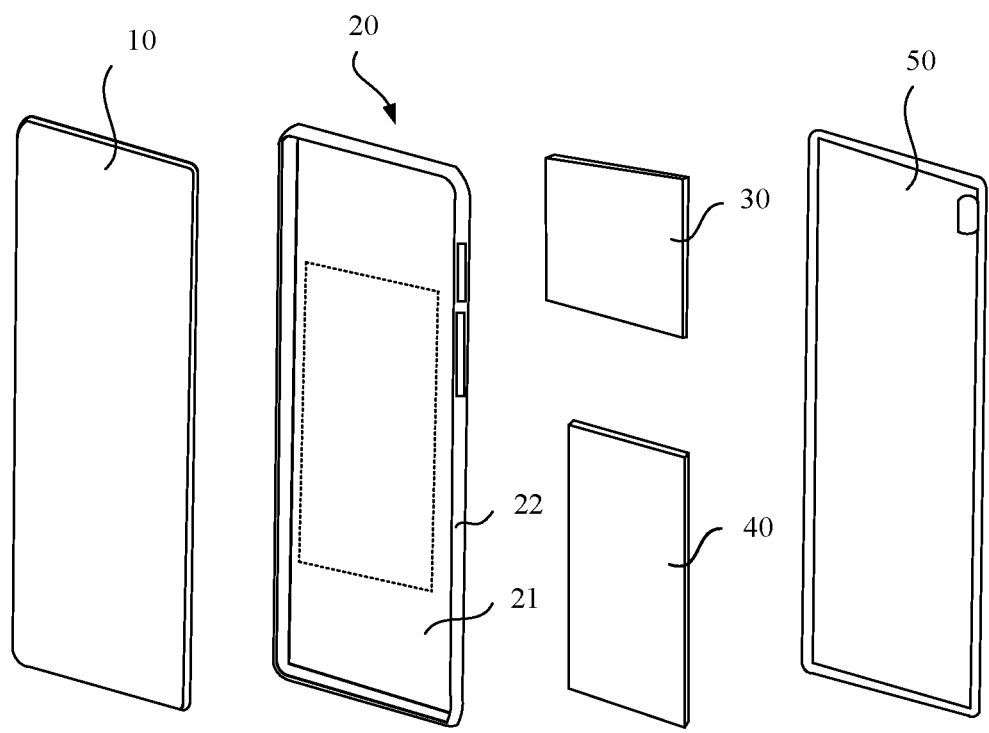
FIG. 2 is a schematic exploded structural diagram of an electronic device according to an embodiment of this application.

In an embodiment of this application, referring to FIG. 1 and FIG. 2, the mobile phone 100 may include a display screen 10 and a rear cover 50. A middle frame 20, a circuit board 30, and a battery 40 may be disposed between the display screen 10 and the rear cover 50. The circuit board 30 and the battery 40 may be disposed on the middle frame 20. For example, the circuit board 30 and the battery 40 are disposed on a surface that is of the middle frame 20 and that faces the rear cover 50. Alternatively, the circuit board 30 and the battery 40 may be disposed on a surface that is of the middle frame 20 and that faces the display screen 10. When the circuit board 30 is disposed on the middle frame 20, the middle frame 20 may be provided with an opening, to place, at the opening of the middle frame 20, an element on the circuit board 30.

When the battery 40 is disposed on the middle frame 20, for example, a battery compartment may be disposed on the surface that is of the middle frame 20 and that faces the rear cover 50, and the battery 40 is disposed in the battery compartment (as shown by a dashed-line box in FIG. 2). In this embodiment of this application, the battery 40 may be connected to the circuit board 30 through a power management module and a charging management module. The power management module receives input of the battery 40 and/or input of the charging management module, and supplies power to a processor, an internal memory, an external memory, the display screen 10, a camera, a communications module, and the like. The power management module may be further configured to monitor parameters such as a capacity of the battery 40, a cycle count of the battery 40, and a status of health of the battery 40 (electric leakage or impedance). In some other embodiments, the power management module may alternatively be disposed in a processor of the circuit board 30. In some other embodiments, the power management module and the charging management module may alternatively be disposed in a same device.

The display screen 10 may be an organic light-emitting diode (Organic Light-Emitting Diode, OLED) display screen, or may be a liquid crystal display (Liquid Crystal Display, LCD) screen. It should be understood that the display screen 10 may include a display and a touch component. The display is configured to output display content to a user, and the touch component is configured to receive a touch event entered by the user on the display screen 10.

The rear cover 50 may be a metal rear cover, a glass rear cover, a plastic rear cover, or a ceramic rear cover. A material of the rear cover 50 is not limited in the embodiments of this application.

It may be understood that an illustrated structure in this embodiment of this application does not constitute a specific limitation on the mobile phone 100. In some other embodiments of this application, the mobile phone 100 may include more or fewer components than those shown in the figure, combine some components, divide some components, or have different component arrangements. For example, the mobile phone 100 may further include components such as the camera (for example, a front-facing camera and a rear-facing camera) and a flash.

In this embodiment of this application, as shown in FIG. 2, the middle frame 20 may include a metal middle plate 21 and an edge frame 22, and the edge frame 22 is disposed for one circle along a periphery of the metal middle plate 21. For example, the edge frame 22 may include a top edge and a bottom edge that are disposed opposite to each other, and a left edge and a right edge that are located between the top edge and the bottom edge and that are disposed opposite to each other. A connection manner between the edge frame 22 and the metal middle plate 21 includes but is not limited to welding, clamping, and integrated injection molding. A material of the metal middle plate 21 may be an aluminum material or an aluminum alloy material, or a material of the metal middle frame 20 may be a stainless steel material. It should be noted that the material of the metal middle frame 20 includes but is not limited to the foregoing material.

Usually, the edge frame 22 may be a metal frame, a glass frame, the plastic frame, or the ceramic frame. However, when the metal frame is used, the metal frame needs to pass through a slit to form the antenna radiator, so that the slit exists on the metal frame. On one hand, an appearance of the metal frame is affected; and on the other hand, a strength of the metal frame is affected due to the slit, and integrity of the metal middle frame is damaged. When the glass frame is used, the mobile phone 100 is prone to cracks after dropping. When the plastic frame is used, texture after a plastic surface is processed and flatness of the plastic surface cannot meet a user requirement for an appearance of the mobile phone 100. When the ceramic frame is used, the ceramic frame is 15 g to 18 g heavier than the glass frame of a same thickness as the ceramic frame. However, when a thickness of the ceramic frame is reduced, a strength of the ceramic frame cannot meet a requirement. In addition, because ceramics have relatively high hardness, when the ceramic frame is used, it is difficult to implement a complex internal structure design on the ceramic frame.

Figure 3:
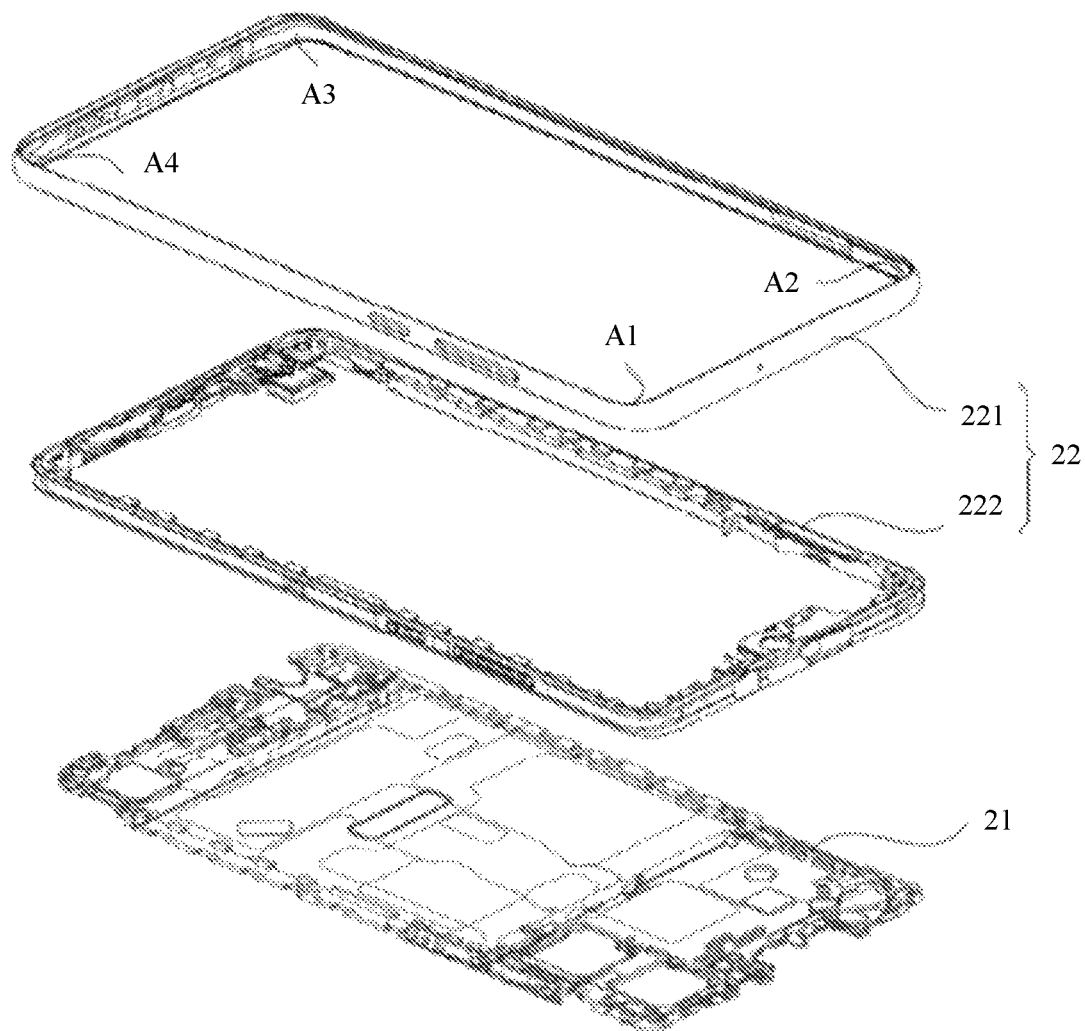
FIG. 3 is a schematic exploded structural diagram of a middle frame of an electronic device according to an embodiment of this application.

Based on the foregoing description, in this embodiment of this application, as shown in FIG. 3, the edge frame 22 may include a plastic frame 222 and a ceramic frame 221. The ceramic frame 221 may be disposed around an outer side surface of the plastic frame 222 to form the edge frame 22 including two materials: a ceramic material and a plastic material. When the ceramic frame 221 and the plastic frame 222 are disposed, the ceramic frame 221 and the plastic frame 222 may be sleeved together. The ceramic frame 221 is located on an outer side, and the plastic frame 222 is located on an inner side. The ceramic frame 221, the plastic frame 222, and the metal middle plate 21 form the middle frame 20 of the electronic device. Because the edge frame 22 includes two materials: the plastic frame 222 and the ceramic frame 221, the plastic frame 222 may provide strength support. In this way, a thickness of the ceramic frame 221 may be reduced. Therefore, a weight of the edge frame 22 including the ceramic frame 221 and the plastic frame 222 can be greatly reduced, and a strength requirement of the edge frame 22 can be met.

In this embodiment of this application, it should be noted that when the ceramic frame 221 and the plastic frame 222 form the edge frame 22, the plastic frame 222 may be disposed for one circle along an inner side wall of the ceramic frame 221, so that the plastic frame 222 can cover the entire inner side wall of the ceramic frame 221.

It is found through detection that a weight of the middle frame 20 including the metal middle plate 21, the plastic frame 222, and the ceramic frame 221 is reduced by 5 g to 20 g in comparison with a weight of a middle frame that is of a same size as the middle frame 20 and that includes a pure ceramic frame and a metal middle plate. The weight of the middle frame 20 including the metal middle plate 21, the plastic frame 222, and the ceramic frame 221 is close to a weight of a metal middle frame of a same size as the middle frame 20. After a drop test and a roller test are performed, and when the electronic device provided in this embodiment of this application uses the edge frame 22 including the ceramic frame 221 and the plastic frame 222, each part of the electronic device does not crack when the electronic device drops at a height of 1.2 m, and does not crack when the electronic device drops after 75 circles during the roller test. A maximum value of a binding force between the plastic frame 222 and the ceramic frame 221 is 994.3 N, and a minimum value is 821.3 N.

Therefore, in the electronic device provided in this application, the edge frame 22 includes the ceramic frame 221 and the plastic frame 222. In this way, on one hand, the thickness of the ceramic frame 221 can be reduced, so that it realizes that a weight of the electronic device is reduced. On the other hand, because an inner side of the edge frame 22 is the plastic frame 222, the plastic frame 222 may provide the strength support for the ceramic frame 221, so that the edge frame 22 meets the strength requirement based on the thickness of the ceramic frame 221 being reduced. In addition, the inner side of the edge frame 22 is the plastic frame 222, and the complex internal structure design (for example, various structure designs formed on an inner side of the plastic frame 222 in FIG. 3) is easily made on the plastic frame 222. This avoids a problem that it is difficult to make the internal structure design on the ceramic frame 221 with relatively high hardness. In this embodiment of this application, because an outer side of the edge frame 22 of the electronic device is the ceramic frame 221, this meets both a high-quality feeling and high hardness of the edge frame 22 of the electronic device.

In a possible implementation, as shown in FIG. 3, the ceramic frame 221 may be of a gapless ring structure. For example, the ceramic frame 221 is of a square ring structure, and the square ring structure may be a continuous ring structure, instead of a ring structure formed by splicing a plurality of edge frames. The plastic frame 222 may be a ring structure disposed along the inner side wall of the ceramic frame 221.

In a possible implementation, as shown in FIG. 3, the ceramic frame 221 has four corners: a corner A1, a corner A2, a corner A3, and a corner A4. To ensure that the four corners are not easily damaged when the mobile phone drops, thicknesses of side walls at the four corners of the ceramic frame 221 may be greater than thicknesses of side walls at non-corner parts of the ceramic frame 221. In this way, it can be ensured that a strength of the corner of the ceramic frame 221 is relatively high, and when the electronic device drops, four corners of the electronic device are not easily damaged.

In a possible implementation, when the ceramic frame 221 is made of the ceramic material, a strength of the ceramic material may be 300-1700 MPa. For example, a ceramic strength of the ceramic frame 221 may be 1100 MPa, or the ceramic strength of the ceramic frame 221 may be 1200 MPa. A ceramic fracture toughness of the ceramic frame 221 may be 2-16 MPa·m1/2. For example, the ceramic fracture toughness of the ceramic frame 221 may be 8 MPa·m1/2, or the ceramic fracture toughness of the ceramic frame 221 may be 10 MPa·m1/2.

In a possible implementation, when the plastic frame 222 is made of the plastic material, a bending modulus of the plastic material may be greater than or equal to 1000 MPa. For example, a plastic bending modulus of the plastic frame 222 may be 2500 MPa, or the plastic bending modulus of the plastic frame 222 may be 2800 MPa.

In a possible implementation, a material of the ceramic frame 221 may include but is not limited to a ceramic material such as zirconia, silicon carbide, silicon nitride, aluminum nitride, or aluminum oxide. For example, the material of the ceramic frame 221 may be a zirconia ceramic piece, or the material of the ceramic frame 221 may be an alumina ceramic piece. It should be understood that, that the material of the ceramic frame 221 is the zirconia, the silicon carbide, the silicon nitride, the aluminum nitride, or the aluminum oxide mainly means that when the ceramic frame 221 is made of the ceramic material, a main raw material in the ceramic material is the zirconia, the silicon carbide, the silicon nitride, the aluminum nitride, or the aluminum oxide.

In a possible implementation, a material of the plastic frame 222 may be polycarbonate (Polycarbonate, PC), or may be plastic alloy. The plastic alloy may be plastic made of the PC and an acrylonitrile-butadiene-styrene copolymer (Acrylonitrile-Butadiene-Styrene, ABS). Alternatively, the material of the plastic frame 222 may be polyamide (polyamide, PA). Alternatively, the material of the plastic frame 222 may be polybutylene terephthalate (polybutylene terephthalate, PBT). It should be noted that the material of the plastic frame 222 includes but is not limited to the PC, the PC+ABS, the PA, and the PBT.

In this embodiment of this application, to further enhance a strength of the plastic frame 222 and further reduce the thickness of the ceramic frame 221, glass fiber may be added to the plastic material of the plastic frame 222. In this way, the strength of the plastic frame 222 can be increased. It should be noted that a material added to the plastic material of the plastic frame 222 includes but is not limited to the glass fiber, and may also be another reinforcing material that can enhance a strength of the plastic material, for example, carbon fiber or graphene.

In a possible implementation, the ceramic frame 221, the plastic frame 222, and the metal middle plate 21 may be integrally formed through an injection molding process. For example, the ceramic frame 221 and the metal middle plate 21 are connected through plastic injection molding. When the injection molding is completed, the plastic frame 222 is formed between the ceramic frame 221 and the metal middle plate 21, and the plastic frame 222 connects the ceramic frame 221 and the metal middle plate 21 to form the integral middle frame 20.

Figure 4:
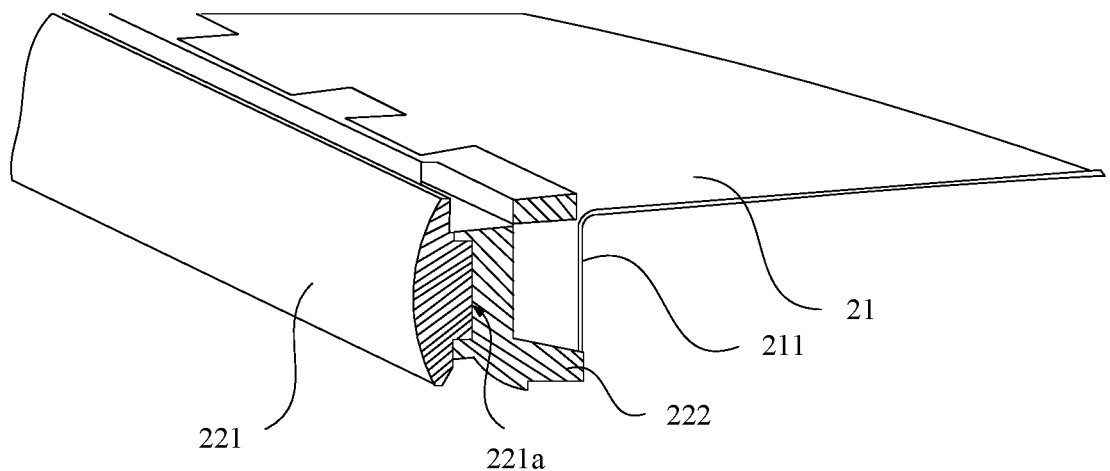
FIG. 4 is a schematic diagram of a partial cross-section structure of a middle frame of an electronic device according to an embodiment of this application.

In a possible implementation, to make the binding force between the ceramic frame 221 and the plastic frame 222 greater, and a binding force between the plastic frame 222 and the metal middle plate 21 greater, referring to FIG. 4, a protrusion structure 221a may be formed on a side that is of the ceramic frame 221 and that faces the metal middle plate 21. The plastic frame has a recessed structure (for example, a structure cooperating with the protrusion structure 221a in FIG. 4) that fits the protrusion structure 221a. In this way, on one hand, a surface area of a side that is of the ceramic frame 221 and that faces the plastic frame 222 is increased, and during injection molding, an engaging area between the ceramic frame 221 and the plastic frame 222 is increased. Therefore, the binding force between the ceramic frame 221 and the plastic frame 222 is increased, and a pulling force between the ceramic frame 221 and the plastic frame 222 is increased, so that it is difficult to crack between the ceramic frame 221 and the plastic frame 222. On the other hand, the protrusion structure 221a is disposed on an inner side of the ceramic frame 221. In this way, when the ceramic frame 221 and the plastic frame 222 are combined to form the edge frame 22, the protrusion structure 221a can enhance a strength of the edge frame 22.

It should be noted that when the protrusion structure 221a is disposed on the side that is of the ceramic frame 221 and that faces the plastic frame 222, the protrusion structure 221a may be disposed for one circle along an inner side surface of the ceramic frame 221, or the protrusion structure 221a may be disposed along two opposite inner side surfaces of the ceramic frame 221.

In a possible implementation, to increase the binding force between the plastic frame 222 and the metal middle plate 21, the periphery of the metal middle plate 21 may be provided with a notch structure or an engaging structure (for example, a notch formed on the periphery of the metal middle plate in FIG. 3). In this way, the binding force between the plastic frame 222 and the metal middle plate 21 is increased in an injection molding process. Alternatively, as shown in FIG. 4, a metal side wall 211 is formed on a part of the periphery of the metal middle plate 21 (for example, a part of the periphery that is of the metal middle plate 21 and that is close to the battery 40). The plastic frame 222 may be located between the metal side wall 211 and the ceramic frame 221. In this way, during injection molding, the plastic frame 222 is combined with the metal side wall 211 of the metal middle plate 21, so that an adhesive area between the plastic frame 222 and the metal middle plate 21 is increased, and an adhesive force is greater.

It should be noted that, during injection molding, some space may be reserved between the metal side wall 211 and the plastic frame 222, so that a conducting wire in the electronic device can pass through the space. In this embodiment of this application, the metal side wall 211 of the metal middle plate 21 and a part of the metal middle plate 21 may further enclose the battery compartment, and the battery 40 may be disposed in the battery compartment.

In a possible implementation, a surface that is of the ceramic frame 221 of the electronic device and that faces outwards may be a vertical surface. For example, the surface that is of the ceramic frame 221 and that faces outwards may be perpendicular to the display screen 10. Alternatively, as shown in FIG. 4, the surface that is of the ceramic frame 221 of the electronic device and that faces outwards may be an arc-shaped surface protruding outwards. In this way, on one hand, it is convenient for the user to hold the ceramic frame 221 of the electronic device; and on the other hand, the ceramic frame 221 has a more good-looking appearance, and the ceramic frame 211 is lighter than the pure ceramic frame of a same thickness.

In this embodiment of this application, the middle frame 20 of the electronic device may be prepared through the following steps.

Step (A): Provide a metal middle plate 21 and a ceramic frame 221.

The metal middle plate 21 may be an aluminum or aluminum alloy plate, or the metal middle plate 21 may be a stainless steel plate. The ceramic frame 221 may be a gapless ceramic frame. For example, the ceramic frame 221 is of the continuous ring structure, and is not formed by splicing a plurality of ceramic segments. In this way, on one hand, it is ensured that no gap exists on the ceramic frame 221, integrity of the ceramic frame 221 is ensured, and the edge frame 22 has a more good-looking appearance and structure. On the other hand, when the ceramic frame 221 of the continuous ring structure is used, and when the ceramic frame 221 and the metal middle frame 20 form an integral structure through injection molding, a problem that the ceramic frame 221 and the plastic frame 222 are independently connected is avoided.

When the metal middle plate 21 is provided, the metal middle plate 21 may be formed through processing performed by a computer numerical control machine (Computer number control, CNC) or through punching. The battery compartment on which the battery 40 is disposed and an opening are formed on the metal middle plate 21, and an outer edge of the metal middle plate 21 is provided with the notch structure or the engaging structure.

When the ceramic frame 221 is provided, the ceramic frame 221 may be obtained after rough processing and surface treatment are performed on a ceramic blank. When the rough processing is performed on the ceramic blank, for example, the CNC or a laser processing manner may be used to remove residues from a cavity edge and a cavity bottom that are in the ceramic blank, and trim a frame body. The surface treatment is performed after the rough processing. For example, two surfaces of the frame body may be separately ground by a grinding device, to obtain a required thickness.

Step (B): Place the metal middle plate 21 and the ceramic frame 221 in a mold for injection molding to form a middle frame 20, where the middle frame 20 may include the metal middle plate 21 and an edge frame 22, and the frame 22 may include the ceramic frame 221 and a plastic frame 222 formed along an inner side of the ceramic frame 221.

When the metal middle plate 21 and the ceramic frame 221 are injection molded in the mold, an in mold labeling (Insert Molding Label, IML) process may be used to perform the injection molding, and the metal middle plate 21 and the ceramic frame 221 are used as inserts. In the injection molding process, the plastic frame 222 may be formed. The plastic frame 222 connects the ceramic frame 221 and the metal middle plate 21 to form the integral structure, and the plastic frame 222 and the ceramic frame 221 form a composite edge frame 22 including two materials: the ceramic material and the plastic material. Because the composite edge frame 22 includes the plastic frame 222, the plastic frame 222 may provide the strength support. In this way, the thickness of the ceramic frame 221 may be reduced, so that a weight of the composite edge frame 22 including the plastic frame 222 and the ceramic frame 221 is greatly reduced in comparison with a weight of a pure ceramic edge frame 22 of a same thickness as the composite edge frame 22. Therefore, a weight of a formed middle frame 20 is reduced, and when the middle frame 20 is applied to the electronic device, the weight of the electronic device is reduced.

In this embodiment of this application, to increase the binding force between the ceramic frame 221 and the plastic frame 222, before the ceramic frame 211 is injection molded, a method further includes: performing protrusion processing on the inner side wall of the ceramic frame 221. For example, the ceramic frame 221 may be positioned on a fixture by a positioning pin. After a cylinder is clamped, a probe tool is used to automatically perform, through a program, processing on the inner side wall of the ceramic frame 221, to form the protrusion structure 221a.

In a possible implementation, before the ceramic frame 211 is injection molded, the method further includes: disposing at least one antenna radiator on the inner side surface of the ceramic frame 221. In this way, in the injection molding process, the antenna radiator is injection molded between the ceramic frame 221 and the plastic frame 222.

In this embodiment of this application, after the step (B) is performed, the method further includes: performing inner cavity CNC refined processing on the middle frame 20. For example, the middle frame 20 is placed into an iron inner cavity jig, and the middle frame 20 may be glued and fixed by UV glue. The middle frame 20 is fixed and positioned on a machine by a magnet jig, and a probe is used for precise positioning and processing.

After the inner cavity CNC refined processing is performed, the method further includes: performing outline CNC processing on the ceramic frame 221. For example, the middle frame 20 on which the inner cavity CNC refined processing has been performed is positioned and fixed, and an outline of the ceramic frame 221 is processed to obtain a required outline.

After the outline CNC processing is performed on the ceramic frame 221, the method further includes: performing, on the ceramic frame 221, rough polishing, side hole processing, fine polishing, and the surface treatment. For example, the rough polishing is first performed on the ceramic frame 221. After the rough polishing is performed, holes are drilled on side surfaces of the ceramic frame 221 and the plastic frame 222, and the holes are processed by the CNC. After the holes are drilled, the fine polishing is performed on the ceramic frame 221. After the fine polishing is performed, the surface treatment is performed on the ceramic frame 221. For example, a coating layer may be plated on a surface of the ceramic frame 221 in a vapor deposition manner. The coating layer may be an anti-fingerprint (Anti Finger, AF) film; and the coating layer makes it difficult to leave a fingerprint on a ceramic surface, and makes the ceramic surface have good wear resistance. Alternatively, a film layer may be deposited on the surface of the ceramic frame 221 through physical vapor deposition (Physical vapor deposition, PVD), so that it is difficult to leave a fingerprint on the ceramic surface, and the ceramic surface has the good wear resistance.

In a possible implementation, the rear cover 50 of the electronic device may also include a plastic cover (not shown) and a ceramic cover (not shown). For example, the plastic cover and the ceramic cover are injection molded to form the rear cover 50 including two materials: the ceramic material and the plastic material. An outer surface of the rear cover 50 may be made of the ceramic material, and an inner surface of the rear cover 50 may be made of the plastic material. The plastic cover may provide the strength support, and the ceramic cover may be thinned. In this way, in comparison with a pure ceramic rear cover, a weight of the rear cover 50 provided in this embodiment of this application may be reduced, to ensure that the weight of the electronic device is reduced. When the rear cover 50 of the electronic device includes the plastic cover and the ceramic cover, in an assembly process, the rear cover 50 may be connected to the edge frame 22 including the ceramic frame 221 and the plastic frame 222 through bonding or clamping to form an outer housing of the mobile phone. An outer surface of the outer housing is made of an all-ceramic material, so that an all-ceramic outer housing is implemented on a premise that the weight of the electronic device is reduced.

Scenario 2

Figure 5:
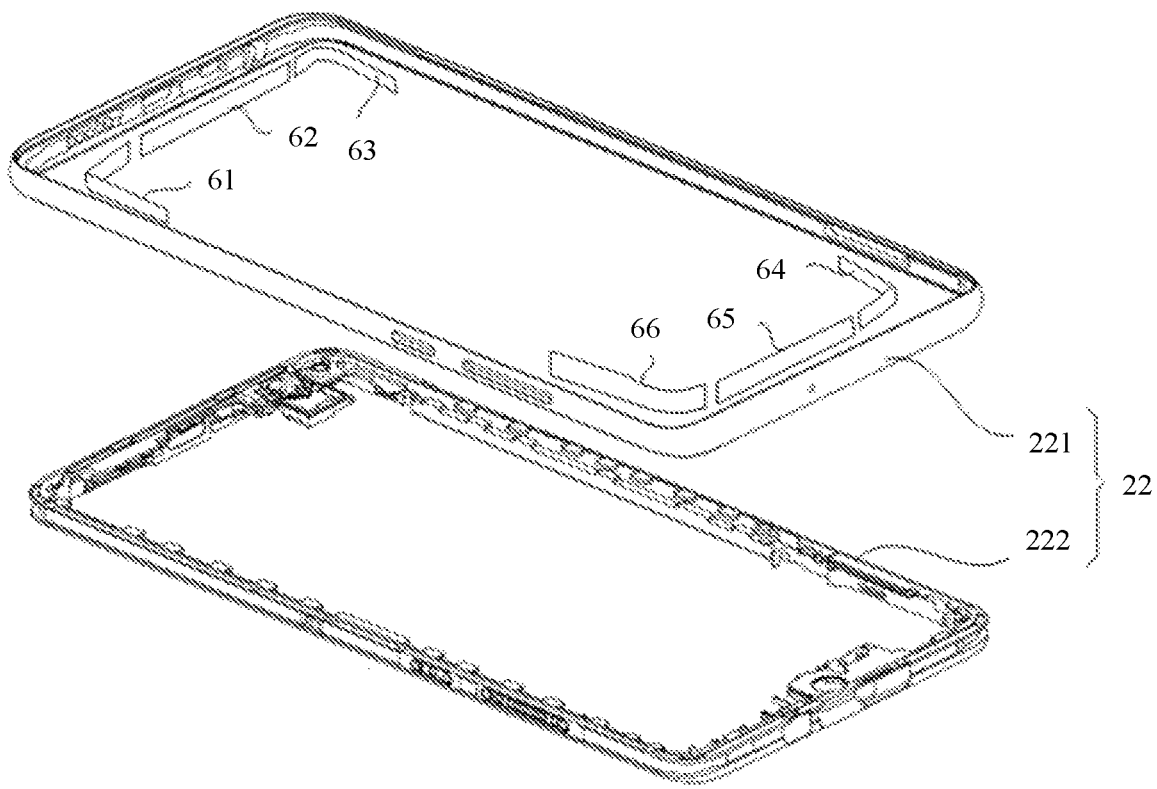
FIG. 5 is a schematic diagram of a disassembled cross-section structure of a ceramic frame, a plastic frame, and an antenna radiator in an electronic device according to an embodiment of this application.

In an embodiment of this application, at least one antenna is disposed in the electronic device to implement signal transmission and signal receiving. The antenna includes the antenna radiator, and a feeding point and a grounding point that are electrically connected to the antenna radiator. In this embodiment of this application, as shown in FIG. 5, the antenna radiator may be disposed between a ceramic frame 221 and a plastic frame 222. For example, a plurality of antenna radiators may be spaced on a side wall that is of the ceramic frame 221 and that faces the plastic frame 222. The plurality of antenna radiators may include a first antenna radiator 61, a second antenna radiator 62, a third antenna radiator 63, a fourth antenna radiator 64, a fifth antenna radiator 65, and a sixth antenna radiator 66. Alternatively, in this embodiment of this application, the antenna radiator may be disposed on a side wall that is of the plastic frame 222 and that faces the ceramic frame 221. Alternatively, the antenna radiator may be disposed on a side wall that is of the plastic frame 222 and that backs towards the ceramic frame 221.

The antenna radiator may be disposed between the ceramic frame 221 and the plastic frame 222 in a plurality of manners. In a possible implementation, the antenna radiator may be formed on an inner side wall of the ceramic frame 221 in an electroplating or laser engraving manner. In another possible implementation, a transfer printing manner may be used to transfer silver paste to the inner side wall of the ceramic frame 221 to form the antenna radiator. When the ceramic frame 221 and a metal middle plate 21 are injection molded, the ceramic frame 221 on which the antenna radiator is disposed is integrated with the metal middle plate 21 in an injection molding manner, and the antenna radiator is injection molded between the ceramic frame 221 and the plastic frame 222. In this embodiment of this application, a material of each antenna radiator includes but is not limited to silver, gold, nickel, stainless steel, or graphite.

Figure 6:
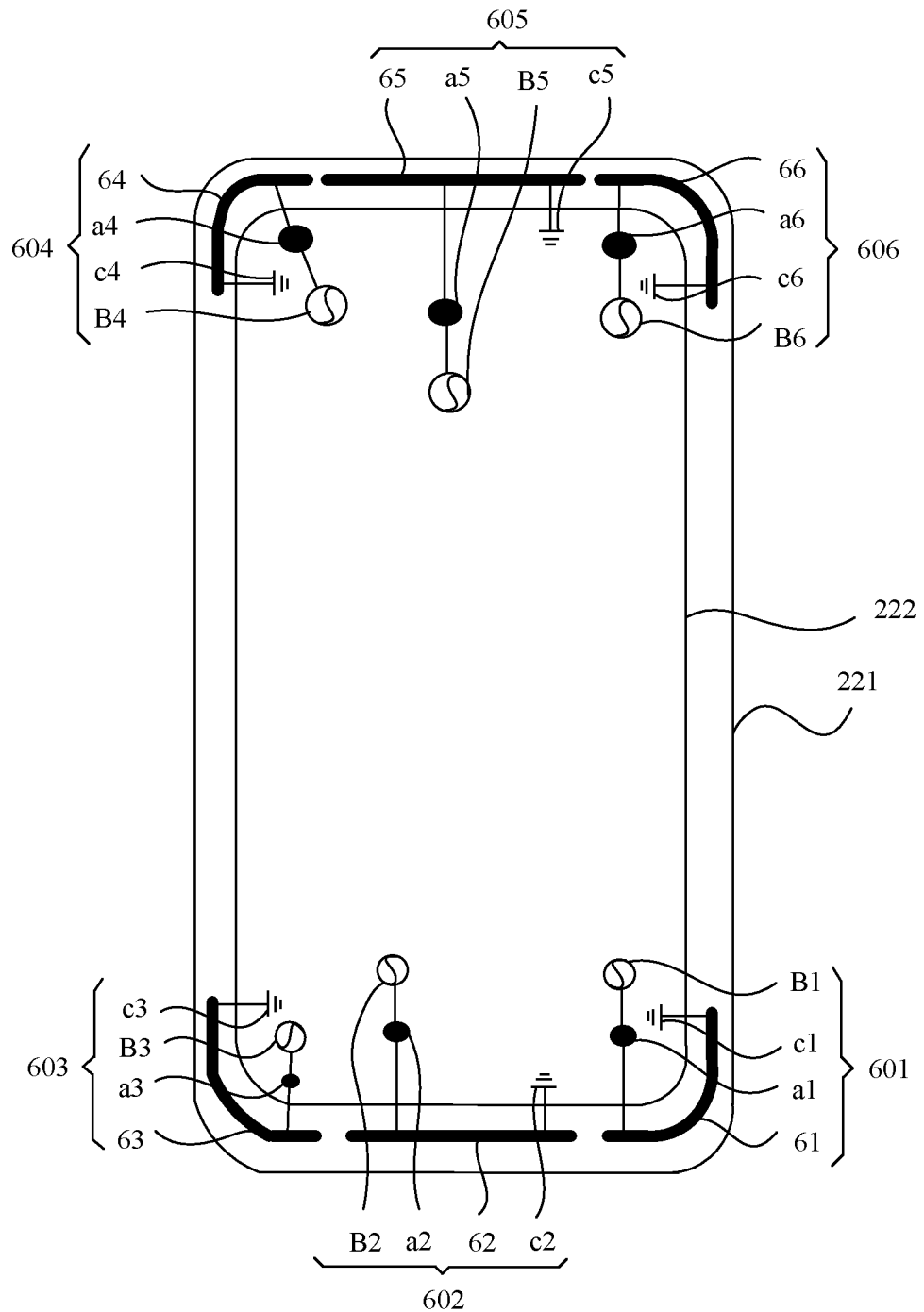
FIG. 6 is a schematic diagram of a structure of a circuit of a ceramic frame, a plastic frame, and an antenna in an electronic device according to an embodiment of this application.

For example, as shown in FIG. 6, six antennas are disposed in the electronic device: a first antenna 601, a second antenna 602, a third antenna 603, a fourth antenna 604, a fifth antenna 605, and a sixth antenna 606. The first antenna 601 may include the first antenna radiator 61, a first feeding point a1, a first grounding point c1, and a first feed B1. The second antenna 602 may include the second antenna radiator 62, a second feeding point a2, a second grounding point c2, and a second feed B2. The third antenna 603 may include the third antenna radiator 63, a third feeding point a3, a third grounding point c3, and a third feed B3. The fourth antenna 604 may include the fourth antenna radiator 64, a fourth feeding point a4, a fourth grounding point c4, and a fourth feed B4. The fifth antenna 605 may include the fifth antenna radiator 65, a fifth feeding point a5, a fifth grounding point c5, and a fifth feed B5. The sixth antenna 606 may include the sixth antenna radiator 66, a sixth feeding point a6, a sixth grounding point c6, and a sixth feed B6. Each feed may feed a high frequency current into each antenna radiator through each feeding point, and the high frequency current is emitted from the antenna radiator in an electromagnetic wave manner. It should be noted that disposing positions of the first antenna 601, the second antenna 602, the third antenna 603, the fourth antenna 604, the fifth antenna 605, and the sixth antenna 606 include but are not limited to disposing positions shown in FIG. 6. The disposing positions of the first antenna 601, the second antenna 602, the third antenna 603, the fourth antenna 604, the fifth antenna 605, and the sixth antenna 606 may be adjusted based on an actual requirement.

Each feeding point and each feed may be located on a circuit board 30, and each feed may be electrically connected to a radio frequency chip or a master chip on the circuit board 30. Each feeding point is disposed close to the antenna radiator, and each feeding point may be electrically connected to each feed through a feeder. Because the metal middle plate 21 is electrically connected to a grounding point of the circuit board 30, in this embodiment of this application, one end of each grounding point is electrically connected to the antenna radiator; and the other end may be connected to the metal middle plate 21 to implement grounding, or may be connected to the grounding point of the circuit board 30 to implement grounding.

In this embodiment of this application, each feeding point may be electrically connected to each antenna radiator in a contact manner, for example, a feeding point structure is connected to the antenna radiator. For example, the feeding point structure may be connected to the antenna radiator in a connection manner such as hot melting or welding, and another end of the feeding point structure is electrically connected to the feeding point on the circuit board 30. It should be noted that a material of the feeding point structure includes but is not limited to a copper sheet, an iron sheet, a nickel sheet, a screw, a printed circuit board (Printed Circuit Board, PCB), or the like. Alternatively, the feeding point is electrically connected to the antenna radiator in a non-contact manner, and the feeding point and the antenna radiator implement, in a coupling manner, that the high frequency current is fed into the antenna radiator.

It should be noted that, in this embodiment of this application, a connection between each feeding point and each antenna radiator includes but is not limited to a connection manner shown in FIG. 6. In another example, the high frequency current may be fed, through the second feeding point a2, into the first antenna radiator 61, the second antenna radiator 62, and the third antenna radiator 63. The first antenna radiator 61 and the third antenna radiator 63 may be used as radiation stubs of the second antenna 602. The second antenna 602 is coupled to the first antenna 601 and the third antenna 603, and the second antenna 602 motivates the first antenna 601 and the third antenna 603. The first antenna 601 and the third antenna 603 are used as parasitic antennas of the second antenna 602. In another example, a quantity of feeding points included in each antenna includes but is not limited to one. For example, the fifth antenna 605 may include two feeding points, and the two feeding points may be electrically connected to the second antenna radiator 62.

In this embodiment of this application, as shown in FIG. 6, the first antenna 601, the second antenna 602, and the third antenna 603 may be primary antennas. For example, the second antenna 602 may be a low-frequency antenna (700-960 MHz) of the primary antenna, and the first antenna 601 and the third antenna 603 may be intermediate-high frequency antennas (1.805-2.69 GHz) of the primary antenna. For example, the first antenna 601 may be a high-frequency antenna (2.3-2.69 GHz), and the third antenna 603 may be the intermediate-high frequency antenna. Alternatively, the first antenna 601 may be an intermediate-frequency antenna (1.71-2.2 GHz), and the third antenna 603 may be the high-frequency antenna (2.3-2.69 GHz).

It should be noted that the primary antenna includes but is not limited to the first antenna 601, the second antenna 602, and the third antenna 603. For example, the primary antenna may also be one or two of the first antenna 601, the second antenna 602, and the third antenna 603, or the primary antenna may include a fourth antenna 604, a fifth antenna 605, and a sixth antenna 606. The primary antenna selects a corresponding antenna based on an actual requirement. The first antenna 601, the second antenna 602, and the third antenna 603 may include but are not limited to the primary antenna. Frequency bands of the first antenna 601, the second antenna 602, and the third antenna 603 include but are not limited to a low frequency band (700-960 MHz), an intermediate frequency band (1.71-2.2 GHz), and a high frequency band (2.3-2.69 GHz). The first antenna 601, the second antenna 602, and the third antenna 603 may be single-band antennas, or may be multi-band antennas.

A low frequency band of the primary antenna may include but is not limited to a B5 frequency band (824-894 MHz), a B8 frequency band (880-960 MHz), and a B28 frequency band (703-803 MHz). An intermediate frequency band of the primary antenna may include but is not limited to a B3 frequency band (1710-1880 MHz) and a B1 frequency band (1920-2170 MHz). A high frequency band of the primary antenna may include but is not limited to a B7 frequency band (2500-2690 MHz).

Alternatively, with development of 5G technologies, an operating frequency band of the primary antenna may further cover a 5G frequency band. For example, the operating frequency band of the primary antenna may further include frequency bands of a 5G system, for example, a frequency band (3300-3600 MHz) and a frequency band (4800-5000 MHz). It should be noted that the 5G frequency band of the primary antenna may include but is not limited to a frequency band below or above 6 GHz.

The fourth antenna 604 may be a Wi-Fi antenna. An operating frequency band of the Wi-Fi antenna may be a frequency band (2400-2500 MHz) or a frequency band (4900-5900 MHz), or the operating frequency band of the Wi-Fi antenna may include the frequency band (2400-2500 MHz) and the frequency band (4900-5900 MHz) Alternatively, the fourth antenna 604 may be a global positioning system (Global Positioning System, GPS) antenna. An operating frequency band of the GPS antenna may be a frequency band (1575±100 MHz). Alternatively, the fourth antenna 604 may be a Bluetooth antenna. An operating frequency band of the Bluetooth antenna may be the frequency band (2400-2500 MHz). It should be noted that the fourth antenna 604 includes but is not limited to the Wi-Fi antenna or the GPS antenna, and the fourth antenna 604 may be another antenna. An operating frequency band of the fourth antenna 604 includes but is not limited to the frequency band (2400-2500 MHz), the frequency band (4900-5900 MHz), or the frequency band (1575±100 MHz).

The fifth antenna 605 may be a diversity antenna. An operating frequency band of the diversity antenna may include but is not limited to the B5 frequency band (824-894 MHz), the B8 frequency band (880-960 MHz), the B28 frequency band (703-803 MHz), the B3 frequency band (1710-1880 MHz), the B7 frequency band (2500-2690 MHz), and the B1 frequency band (1920-2170 MHz). It should be noted that, with development of 5G technologies, the operating frequency band of the diversity antenna may further cover a 5G frequency band. For example, the operating frequency band of the diversity antenna may further include a frequency band of a 5G system, for example, the frequency band (3300-3600 MHz) and the frequency band (4800-5000 MHz). It should be noted that the 5G frequency band of the diversity antenna may include but is not limited to a frequency band below or above 6 GHz. The fifth antenna 605 includes but is not limited to the diversity antenna, or may be another antenna, for example, the Wi-Fi antenna or the primary antenna. An operating frequency band of the fifth antenna 605 includes but is not limited to the low frequency band, the intermediate frequency band, and the high frequency band.

The sixth antenna 606 may be a diversity multiple-input multiple-output (Multiple-Input Multiple-Output, MIMO) antenna. The diversity MIMO antenna may cover a low frequency band, an intermediate frequency band, and a high frequency band (for example, the low frequency band is 700-960 MHz, the intermediate frequency band is 1.71-2.2 GHz, and the high frequency band is 2.3-2.7 GHz). It should be noted that, with development of 5G technologies, an operating frequency band of the diversity MIMO antenna may further cover a 5G frequency band. For example, the operating frequency band of the diversity MIMO antenna may further include a frequency band of a 5G system, for example, the frequency band (3300-3600 MHz) and the frequency band (4800-5000 MHz). It should be noted that the 5G frequency band of the diversity MIMO antenna may include but is not limited to a frequency band below or above 6 GHz. In this embodiment of this application, the sixth antenna 606 may alternatively be the Wi-Fi antenna.

It should be noted that types of the fourth antenna 604, the fifth antenna 605, and the sixth antenna 606 include but are not limited to the foregoing various antennas. In actual application, positions of the Wi-Fi antenna, the diversity antenna, and the MIMO antenna may be adjusted based on an actual requirement.

In a possible implementation, material impedance of the first antenna 601, the second antenna 602, the third antenna 603, the fourth antenna 604, the fifth antenna 605, and the sixth antenna 606 is not greater than 5Ω. It should be understood that, in this embodiment of this application, the material impedance of the first antenna 601, the second antenna 602, the third antenna 603, the fourth antenna 604, the fifth antenna 605, and the sixth antenna 606 specifically is material impedance of the first antenna radiator 61, the second antenna radiator 62, the third antenna radiator 63, the fourth antenna radiator 64, the fifth antenna radiator 65, and the sixth antenna radiator 66. In this embodiment of this application, impedance of the first antenna 601, the second antenna 602, the third antenna 603, the fourth antenna 604, the fifth antenna 605, and the sixth antenna 606 may be 1Ω. Alternatively, the impedance of the first antenna 601, the second antenna 602, the third antenna 603, the fourth antenna 604, the fifth antenna 605, and the sixth antenna 606 may be 3Ω. The impedance of the first antenna 601, the second antenna 602, the third antenna 603, the fourth antenna 604, the fifth antenna 605, and the sixth antenna 606 may be the same or may be different. The material impedance of the first antenna 601, the second antenna 602, the third antenna 603, the fourth antenna 604, the fifth antenna 605, and the sixth antenna 606 is set to be within 5Ω, so that electrical conductivities of the first antenna radiator 61, the second antenna radiator 62, the third antenna radiator 63, the fourth antenna radiator 64, the fifth antenna radiator 65, and the sixth antenna radiator 66 are relatively high. During radiation, radiation efficiency of the antenna is high, so that performance of the antenna is improved.

In a possible implementation, clearances of the first antenna 601, the second antenna 602, the third antenna 603, the fourth antenna 604, the fifth antenna 605, and the sixth antenna 606 may be less than 10 mm. It should be understood that the clearances of the first antenna 601, the second antenna 602, the third antenna 603, the fourth antenna 604, the fifth antenna 605, and the sixth antenna 606 are distances between a metallic material (for example, the metal middle plate 21 or the circuit board 30) and the first antenna radiator 61, the second antenna radiator 62, the third antenna radiator 63, the fourth antenna radiator 64, the fifth antenna radiator 65, and the sixth antenna radiator 66. For example, the clearances of the first antenna 601, the second antenna 602, the third antenna 603, the fourth antenna 604, the fifth antenna 605, and the sixth antenna 606 may be 1 mm, or the clearances of the first antenna 601, the second antenna 602, the third antenna 603, the fourth antenna 604, the fifth antenna 605, and the sixth antenna 606 may be 5 mm.

It should be noted that, when the first antenna 601, the second antenna 602, and the third antenna 603 are used as primary antennas, clearances of the first antenna 601, the second antenna 602, and the third antenna 603 may be greater than clearances of the fourth antenna 604, the fifth antenna 605, and the sixth antenna 606.

Figure 7:
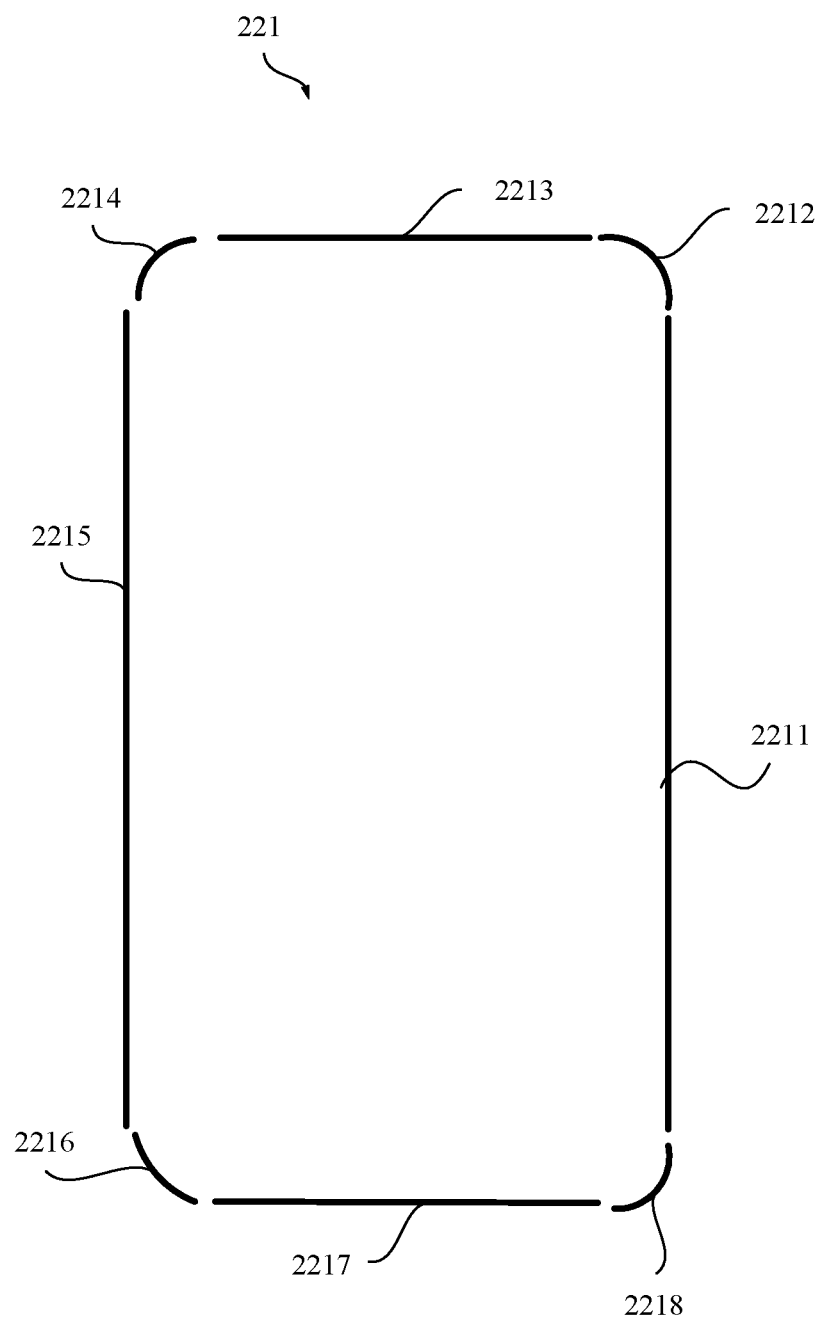
FIG. 7 is a schematic diagram of a structure of a ceramic frame in an electronic device according to an embodiment of this application.

In a possible implementation, when the antenna radiator is disposed between the ceramic frame 221 and the plastic frame 222, the ceramic frame 221 may be a gapless ring ceramic frame disposed around an outer side surface of the plastic frame 222, as shown in FIG. 5. Alternatively, the ceramic frame may be a plurality of ceramic segments disposed on the outer side surface of the plastic frame 222. For example, as shown in FIG. 7, the ceramic frame 221 may include a plurality of ceramic sub-frames, and the plurality of ceramic sub-frames may form, in a splicing manner, the ceramic frame of a ring structure. The ceramic frame 221 is of a discontinuous ring structure.

For example, as shown in FIG. 7, the ceramic frame 221 may include eight ceramic sub-frames: a first ceramic sub-frame 2211, a second ceramic sub-frame 2212, a third ceramic sub-frame 2213, a fourth ceramic sub-frame 2214, a fifth ceramic sub-frame 2215, a sixth ceramic sub-frame 2216, a seventh ceramic sub-frame 2217, and an eighth ceramic sub-frame 2218. The eight ceramic sub-frames 22 are connected in sequence to form the ring ceramic frame 221. It should be noted that the ceramic sub-frames 22 in the ceramic frame 221 include but are limited to eight ceramic sub-frames, and a quantity of the ceramic sub-frames 22 may be set based on an actual requirement.

Figure 8:
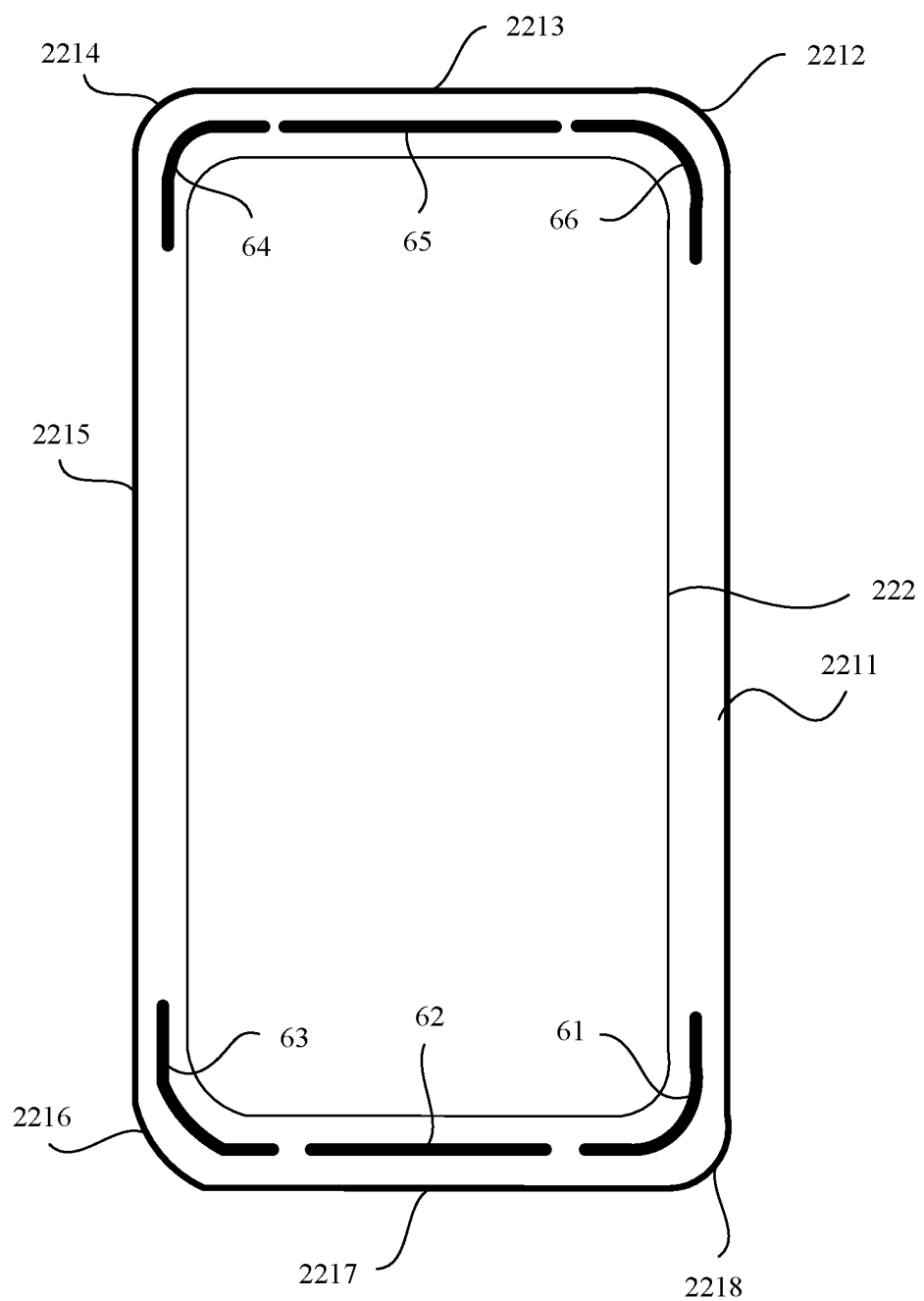
FIG. 8 is a schematic diagram of a structure of a ceramic frame, a plastic frame, and an antenna radiator in an electronic device according to an embodiment of this application.

For example, as shown in FIG. 8, the eight ceramic sub-frames 22 are connected in sequence and disposed on an outer surface of the plastic frame 222. The first antenna radiator 61, the second antenna radiator 62, the third antenna radiator 63, the fourth antenna radiator 64, the fifth antenna radiator 65, and the sixth antenna radiator 66 may be located between the plastic frame 222 and the eight ceramic sub-frames. During manufacturing, each antenna radiator may be disposed on the ceramic sub-frame, and then each ceramic sub-frame and the metal middle plate 21 form the plastic frame 222 on an inner side surface of each ceramic sub-frame 22 through plastic injection molding. The plastic frame 222 connects each ceramic sub-frame and the metal middle plate 21 to form an integral structure, and each antenna radiator is injection molded between the plastic frame 222 and each ceramic sub-frame.

Scenario 3

Figure 9:
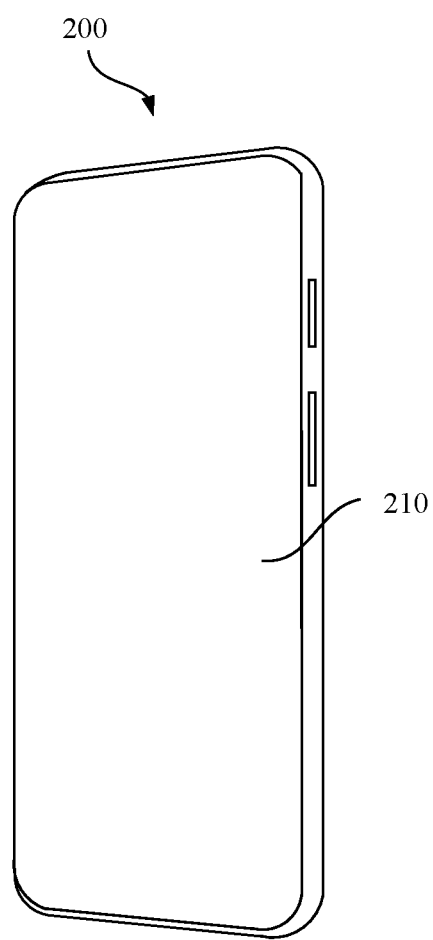
FIG. 9 is a schematic diagram of another three-dimensional structure of an electronic device according to an embodiment of this application.
Figure 10:
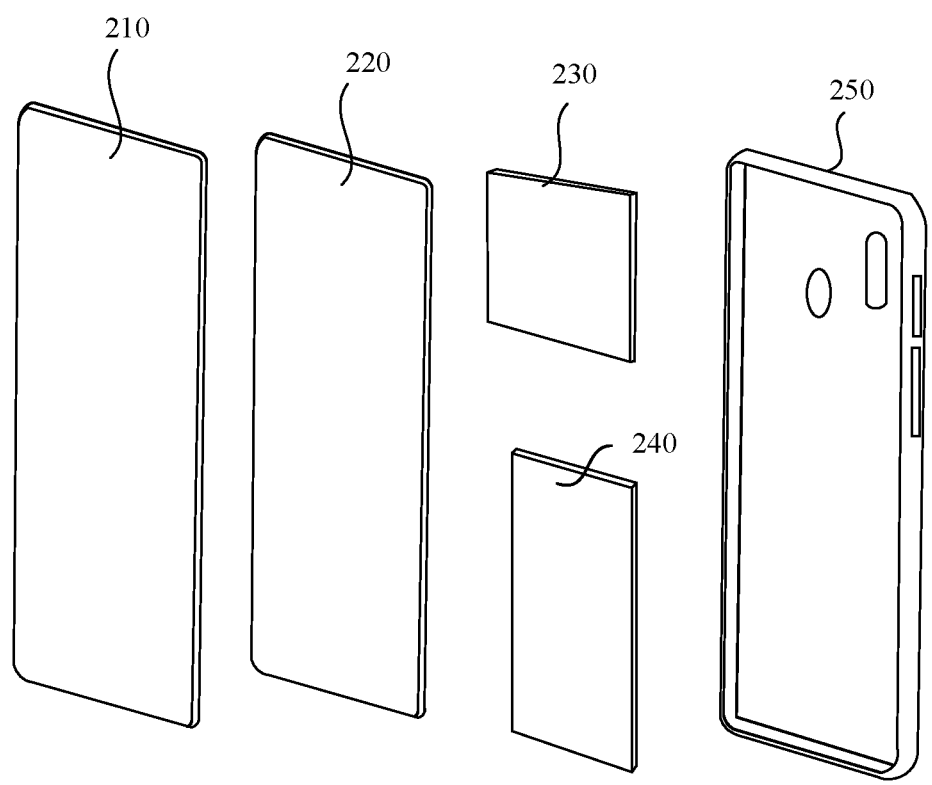
FIG. 10 is a schematic exploded structural diagram of an electronic device according to an embodiment of this application.

In an embodiment of this application, referring to FIG. 9 and FIG. 10, a mobile phone 200 may include a display screen 210 and a battery cover 250. A middle plate 220, a circuit board 230, and a battery 240 may be disposed between the display screen 210 and the battery cover 250. The circuit board 230 and the battery 240 may be disposed in space enclosed by the battery cover 250 and the middle plate 220. In this embodiment of this application, a periphery of the middle plate 220 may be connected to the battery cover 250. Alternatively, in another example, the mobile phone 200 may further include a front housing (not shown). The front housing may be located between the display screen 210 and the middle plate 220, and the middle plate 220 may be connected to the front housing to form an integral structure. During assembly, the structure including the middle plate 220 and the front housing is assembled with the battery cover 250. The middle plate 220 may be a metal plate such as an aluminum plate or an aluminum alloy plate.

In this embodiment of this application, the battery 240 may be connected to the circuit board 230 through a power management module and a charging management module. The power management module receives input of the battery 240 and/or input of the charging management module, and supplies power to a processor, an internal memory, an external memory, the display screen 210, a camera, a communications module, and the like. The power management module may be further configured to monitor parameters such as a capacity of the battery 240, a cycle count of the battery 240, and a status of health of the battery 240 (electric leakage or impedance). In some other embodiments, the power management module may alternatively be disposed in a processor of the circuit board 230. In some other embodiments, the power management module and the charging management module may alternatively be packaged in a same device.

The display screen 210 may be an organic light-emitting diode (Organic Light-Emitting Diode, OLED) display screen 210, or may be a liquid crystal display (Liquid Crystal Display, LCD) screen 210. It should be understood that the display screen 210 may include a display and a touch component. The display is configured to output display content to a user, and the touch component is configured to receive a touch event entered by the user on the display screen 210.

It may be understood that an illustrated structure in this embodiment of this application does not constitute a specific limitation on the mobile phone 200. In some other embodiments of this application, the mobile phone 200 may include more or fewer components than those shown in the figure, combine some components, divide some components, or have different component arrangements. For example, the mobile phone 200 may further include components such as the camera (for example, a front-facing camera and a rear-facing camera) and a flash.

Usually, the battery cover 250 may be a metal battery cover, a glass battery cover, a plastic battery cover, or a pure ceramic battery cover. However, when the battery cover 250 is the metal battery cover, the antenna in the electronic device is shielded. Therefore, the metal battery cover usually needs to have a slit or adopt a three-segment structure design (for example, the middle of the battery cover 250 is made of a metallic material, and the top and the bottom of the battery cover 250 are made of a plastic material), so that the metal battery cover is not an integral structure. When the glass battery cover is used, the glass battery cover is easy to crack when the electronic device drops, and maintenance costs are relatively high. When the plastic battery cover is used, texture of an outer housing of the electronic device cannot meet a user requirement. When the ceramic battery cover is used, the ceramic battery cover is heavier than the glass battery cover of a same thickness as the ceramic battery cover, so that the electronic device is relatively heavy. However, when a thickness of the ceramic battery cover is reduced, a strength of the ceramic battery cover cannot meet a requirement. In addition, because ceramics have relatively high hardness, when the ceramic battery cover is used, it is difficult to implement a complex internal structure design on the ceramic battery cover.

Figure 11:
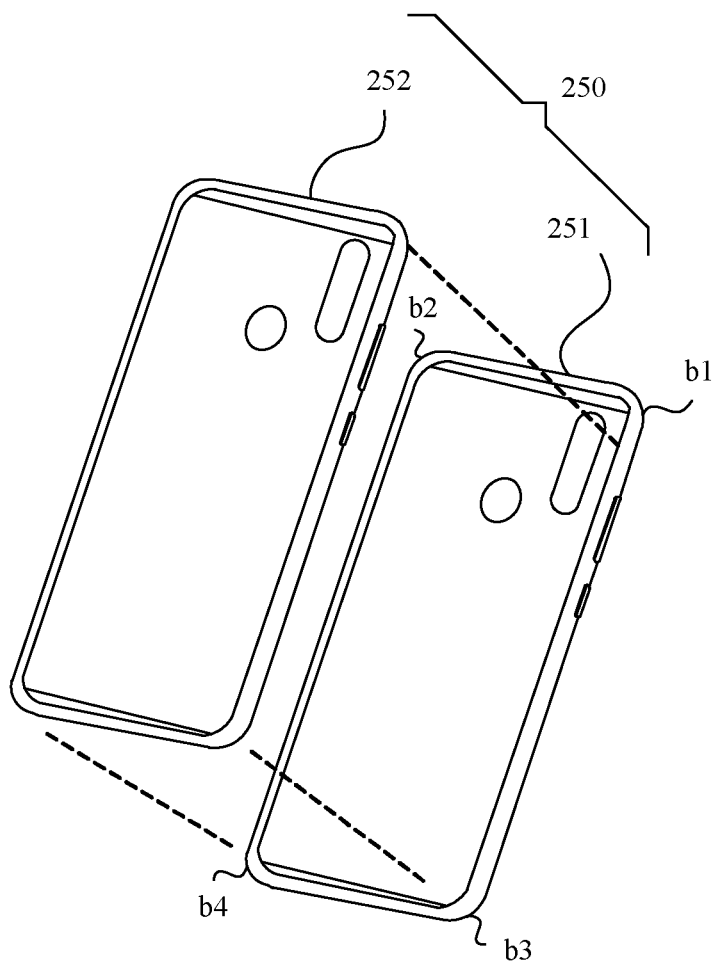
FIG. 11 is a schematic exploded structural diagram of a battery cover of an electronic device according to an embodiment of this application.

Therefore, in this embodiment of this application, as shown in FIG. 11, the battery cover 250 may include a ceramic outer housing 251 and a plastic inner housing 252. The plastic inner housing 252 covers an inner surface of the ceramic outer housing 251 (that is, a surface that is of the ceramic outer housing 251 and that faces the battery 240). The ceramic outer housing 251 and the plastic inner housing 252 are mutually fitted to form the battery cover 250 made of two materials: a ceramic material and a plastic material. In this embodiment of this application, the ceramic outer housing 251 may be located on an outer surface of the mobile phone 200, and the plastic inner housing 252 is located on the inner surface of the ceramic outer housing 251. Because the plastic inner housing 252 can provide strength support, a thickness of the ceramic outer housing 251 can be reduced. In comparison with the pure ceramic outer housing 251 of a same thickness as the battery cover 250, in this embodiment of this application, a weight of the battery cover 250 including the ceramic outer housing 251 and the plastic inner housing 252 is greatly reduced on a premise that a strength requirement is met.

In addition, because an inner surface of the battery cover 250 is the plastic inner housing 252, the complex internal structure design can be easily disposed on the plastic inner housing 252. This avoids a problem that it is difficult to make the complex internal structure design on the ceramic outer housing 251 with relatively high hardness.

Therefore, in the electronic device provided in this embodiment of this application, the battery cover 250 includes the ceramic outer housing 251 and the plastic inner housing 252. In this way, on one hand, the weight of the battery cover 250 is reduced, so that a weight of the electronic device is reduced; and on the other hand, it realizes that the complex internal structure design is easily made on the plastic inner housing 252. This avoids the problem that it is difficult to make the internal structure design on the ceramic outer housing 251 with the relatively high hardness.

In a possible implementation, as shown in FIG. 11, the ceramic outer housing 251 has four corners: a corner b1, a corner b2, a corner b3, and a corner b4. To ensure that the four corners are not easily damaged when the mobile phone drops, thicknesses of side walls at the four corners of the ceramic outer housing 251 may be greater than thicknesses of side walls at non-corner parts of the ceramic outer housing 251. In this way, it can be ensured that a strength of a corner of the electronic device is relatively high, and when the electronic device drops, four corners of the electronic device are not easily damaged. It should be noted that, in this embodiment of this application, thicknesses of side walls at four corners of the plastic inner housing 252 may also be greater than thicknesses of side walls at other parts of the plastic inner housing 252. In this way, thicknesses of side walls at four corners of the battery cover 250 including the ceramic outer housing 251 and the plastic inner housing 252 are greater than thicknesses of side walls at non-corner parts of the battery cover 250. When the electronic device drops, the four corners of the battery cover 250 are hard to crack.

In a possible implementation, the plastic inner housing 252 and the ceramic outer housing 251 may be integrally formed through bonding, clamping, or plastic injection molding. For example, in this embodiment of this application, the ceramic outer housing 251 may be placed in a mold for the plastic injection molding, and the inner surface of the ceramic outer housing 251 is injection molded to form the plastic inner housing 252. In an injection molding process, the ceramic outer housing 251 and the plastic inner housing 252 are combined to form the battery cover 250 with a two-layer structure. In this way, on one hand, a connection between the ceramic outer housing 251 and the plastic inner housing 252 is implemented, on the other hand, the battery cover 250 with the two-layer structure meets the strength requirement of the battery cover 250, so that the thickness of the ceramic outer housing 251 can be reduced.

Figure 12:
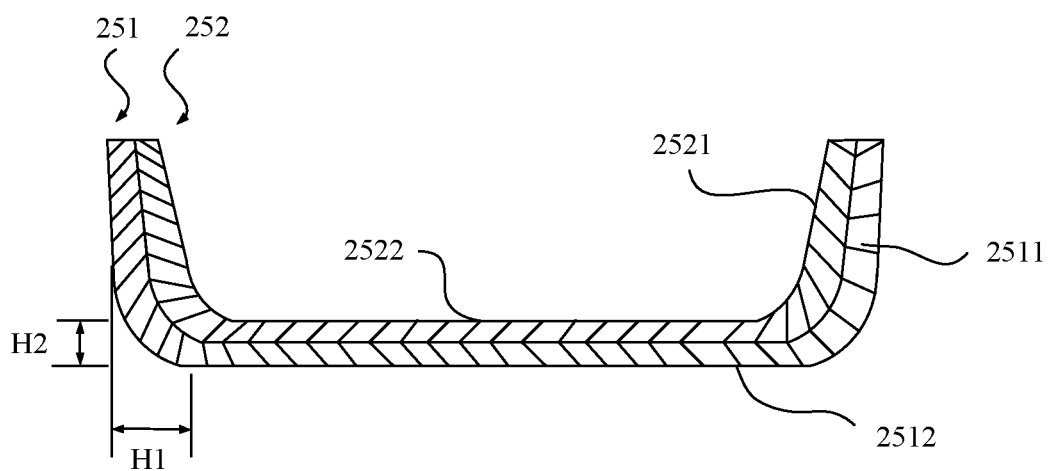
FIG. 12 is a schematic diagram of a cross-section structure of a battery cover of an electronic device according to an embodiment of this application.

In a possible implementation, as shown in FIG. 12, the ceramic outer housing 251 may include an outer bottom housing 2512 and an outer side housing 2511. The outer side housing 2511 is disposed around a periphery of the outer bottom housing 2512, and the outer side housing 2511 and the outer bottom housing 2512 enclose a groove having a U-shaped cross section. The outer side housing 2511 and the outer bottom housing 2512 may be integrally formed.

The plastic inner housing 252 may include an inner bottom housing 2522 and an inner side housing 2521. The inner side housing 2521 is disposed around a periphery of the inner bottom housing 2522, and the inner side housing 2521 and the inner bottom housing 2522 enclose a groove having a U-shaped cross section. During assembly, the outer side housing 2511 is fitted to the inner side housing 2521 to form a side cover of the battery cover 250, and the outer bottom housing 2512 is fitted to the inner bottom housing 2522 to form a bottom cover of the battery cover 250. A cross section of the battery cover 250 is of a U-shaped structure, and the circuit board 230, the battery 240, or another component may be disposed in the U-shaped structure of the battery cover 250.

In a possible implementation, the outer bottom housing 2512 and the outer side housing 2511 of the ceramic outer housing 251 may be connected through welding, clamping, or a fastener, or the outer bottom housing 2512 and the outer side housing 2511 are integrally formed. The inner bottom housing 2522 and the inner side housing 2521 of the plastic inner housing 252 may be connected through welding, clamping, or a fastener, or the inner bottom housing 2522 and the inner side housing 2521 are integrally formed.

In a possible implementation, a sum H2 of thicknesses of the outer bottom housing 2512 of the ceramic outer housing 251 and the inner bottom housing 2522 of the plastic inner housing 252 may be 0.45-0.9 mm. For example, the sum H2 of the thicknesses of the outer bottom housing 2512 and the inner bottom housing 2522 may be 0.7 mm, or the sum H2 of the thicknesses of the outer bottom housing 2512 and the inner bottom housing 2522 may be 0.8 mm. A sum H1 of thicknesses of the outer side housing 2511 of the ceramic outer housing 251 and the inner side housing 2521 of the plastic inner housing 252 may be 0.45-1.6 mm. For example, the sum H1 of the thicknesses of the outer side housing 2511 and the inner side housing 2521 may be 1.3 mm, or the sum H1 of the thicknesses of the outer side housing 2511 and the inner side housing 2521 may be 1.5 mm.

In a possible implementation, a wall thickness of the outer bottom housing 2512 of the ceramic outer housing 251 may be 0.2-0.6 mm. For example, the wall thickness of the outer bottom housing 2512 of the ceramic outer housing 251 may be 0.25 mm, and if the sum H2 of the thicknesses of the outer bottom housing 2512 and the inner bottom housing 2522 may be 0.75 mm, a wall thickness of the inner bottom housing 2522 of the plastic inner housing 252 may be 0.5 mm. A wall thickness of the outer side housing 2511 of the ceramic outer housing 251 may be 0.25-0.8 mm. For example, the wall thickness of the outer side housing 2511 of the ceramic outer housing 251 may be 0.8 mm, the sum H1 of the thicknesses of the outer side housing 2511 and the inner side housing 2521 may be 1.5 mm, and a wall thickness of the inner side housing 2521 of the plastic inner housing 252 may be 0.7 mm. It should be understood that, because thicknesses of positions on the plastic inner housing 252 and the ceramic outer housing 251 are uneven, the foregoing thickness H2 is a maximum thickness of the bottom cover and the side cover of the battery cover 250.

In a possible implementation, when the ceramic outer housing 251 is made of the ceramic material, a strength of the ceramic material may be 300-1700 MPa. For example, a ceramic strength of the ceramic outer housing 251 may be 1000 MPa, or the ceramic strength of the ceramic outer housing 251 may be 1500 MPa. It should be noted that, because the ceramic outer housing 251 includes the outer bottom housing 2512 and the outer side housing 2511, it should be understood that, that the ceramic strength of the ceramic outer housing 251 is 300-1700 MPa means that both ceramic strengths of the outer bottom housing 2512 and the outer side housing 2511 of the ceramic outer housing 251 are 300-1700 MPa. A ceramic fracture toughness of the ceramic outer housing 251 may be 2-16 MPa·m1/2. For example, the ceramic fracture toughness of the ceramic outer housing 251 may be 8 MPa·m1/2, or the ceramic fracture toughness of the ceramic outer housing 251 may be 10 MPa·m1/2.

In a possible implementation, when the plastic inner housing 252 is made of the plastic material, a bending modulus of the plastic material may be greater than or equal to 1000 MPa. For example, a bending modulus of the plastic inner housing 252 may be 2000 MPa, or the bending modulus of the plastic inner housing 252 may be 2500 MPa.

In a possible implementation, a material of the ceramic outer housing 251 may include but is not limited to a ceramic material such as zirconia, silicon carbide, silicon nitride, aluminum nitride, or aluminum oxide. For example, the material of the ceramic outer housing 251 may be a zirconia ceramic piece, or the material of the ceramic outer housing 251 may be an alumina ceramic piece. It should be understood that, that the material of the ceramic outer housing 251 is the zirconia, the silicon carbide, the silicon nitride, the aluminum nitride, or the aluminum oxide mainly means that when the ceramic outer housing 251 is made of the ceramic material, a main raw material in the ceramic material is the zirconia, the silicon carbide, the silicon nitride, the aluminum nitride, or the aluminum oxide.

In a possible implementation, a material of the plastic inner housing 252 may be polycarbonate (Polycarbonate, PC), or may be plastic alloy. The plastic alloy may be plastic made of the PC and an acrylonitrile-butadiene-styrene copolymer (Acrylonitrile-Butadiene-Styrene, ABS). Alternatively, the material of the plastic inner housing 252 may be polyamide (polyamide, PA). Alternatively, a material of a plastic frame 222 may be polybutylene terephthalate (polybutylene terephthalate, PBT). It should be noted that the material of the plastic frame 222 includes but is not limited to the PC, the PC+ABS, the PA, and the PBT.

In this embodiment of this application, to further enhance a strength of the plastic inner housing 252, glass fiber may be added to the plastic material of the plastic inner housing 252. In this way, the strength of the plastic inner housing 252 can be increased. It should be noted that a material added to the plastic material of the plastic inner housing 252 includes but is not limited to the glass fiber, and may also be another material that can enhance a strength of the plastic material, for example, carbon fiber or graphene.

In a possible implementation, the battery cover 250 provided in this embodiment of this application is prepared through the following steps.

Step (a): Provide a ceramic outer housing 251.

In this embodiment of this application, the ceramic outer housing 251 may be obtained after rough processing and surface treatment are performed on a ceramic blank. When the rough processing is performed on the ceramic blank, for example, a CNC or a laser processing manner may be used to remove residues from a cavity edge and a cavity bottom that are in the ceramic blank, and trim the ceramic outer housing 251. The surface treatment is performed after the rough processing. For example, a surface of the ceramic outer housing 251 may be roughly ground by a grinding device, to obtain a required thickness.

Step (b): Place the ceramic outer housing 251 in a mold for injection molding to form a battery cover 250, where the battery cover 250 includes the ceramic outer housing 251 and a plastic inner housing 252 injection molded on an inner surface of the ceramic outer housing 251.

When the ceramic outer housing 251 is injection molded in the mold, an IML process may be used to perform the injection molding, and the ceramic outer housing 251 is used as an insert. In the injection molding process, the plastic inner housing 252 may be formed on the ceramic outer housing 251. The ceramic outer housing 251 and the plastic inner housing 252 form the composite battery cover 250 with a ceramic outer surface and a plastic inner surface.

After the step (b) is performed, a method further includes: performing inner cavity CNC refined processing on the prepared battery cover 250. For example, the battery cover 250 is placed into an iron inner cavity jig, and the battery cover 250 may be glued and fixed by UV glue. The battery cover 250 is fixed and positioned on a machine by a magnet jig, and a probe is used for precise positioning and processing.

In this embodiment of this application, to increase a binding force between the ceramic outer housing 251 and the plastic inner housing 252, before the ceramic outer housing 251 is injection molded, the method further includes: performing protrusion processing on an inner side wall of the ceramic outer housing 251. For example, the ceramic outer housing 251 may be positioned on a fixture by a positioning pin. After a cylinder is clamped, a probe tool is used to automatically perform, through a program, processing on the inner surface of the ceramic outer housing 251, to form a protrusion structure. In this way, during injection molding, a contact area between the plastic inner housing 252 and the ceramic outer housing 251 is larger, and the binding force is greater.

After the inner cavity CNC refined processing is performed, the method further includes: performing outline CNC processing on the ceramic outer housing 251. For example, the battery cover 250 on which the inner cavity CNC refined processing has been performed is positioned and fixed, and an outline of the ceramic outer housing 251 is processed to obtain a required outline.

After the outline CNC processing is performed on the ceramic outer housing 251, the method further includes: performing, on the ceramic outer housing 251, rough polishing, side hole processing, fine polishing, and the surface treatment. For example, the rough polishing is first performed on the ceramic outer housing 251. After the rough polishing is performed, holes (for example, a power button hole, a camera assembly hole, and the like) are drilled on the bottom cover and the side cover of the battery cover 250, and the holes are processed by the CNC. After the holes are drilled, the fine polishing is performed on the ceramic outer housing 251. After the fine polishing is performed, the surface treatment is performed on the ceramic outer housing 251. For example, a coating layer may be plated on the surface of the ceramic outer housing 251 in a vapor deposition manner. The coating layer may be an anti-fingerprint (Anti Finger, AF) film; and the coating layer makes it difficult to leave a fingerprint on a ceramic surface, and makes the ceramic surface have good wear resistance. Alternatively, a film layer may be deposited on the surface of the ceramic outer housing 251 through physical vapor deposition (Physical vapor deposition, PVD), so that it is difficult to leave a fingerprint on the ceramic surface, and the ceramic surface has the good wear resistance.

It is found through detection that the weight of the battery cover 250 prepared in the foregoing steps is 10-25 g less than a weight of the pure ceramic outer housing of a same size as the battery cover 250. The weight of the prepared battery cover 250 is close to a weight of the metal battery cover of a same size as the battery cover 250. After a drop test and a roller test are performed, and when the electronic device provided in this embodiment of this application uses the battery cover 250 including the ceramic outer housing 251 and the plastic inner housing 252, each part of the electronic device does not crack when the electronic device drops at a height of 1.2 m, and does not crack when the electronic device drops after 75 circles during the roller test. A maximum value of the binding force between the plastic inner housing 252 and the ceramic outer housing 251 is 994.3 N, and a minimum value is 821.3 N.

Therefore, in the electronic device provided in this application, the battery cover 250 includes the ceramic outer housing 251 and the plastic inner housing 252. In this way, on one hand, the thickness of the ceramic outer housing 251 can be reduced, so that it realizes that the weight of the electronic device is reduced. On the other hand, because an inner side of the battery cover 250 is the plastic inner housing 252, the plastic inner housing 252 may provide the strength support for the ceramic outer housing 251, so that the edge frame 22 meets the strength requirement based on the thickness of the ceramic outer housing 251 being reduced. In addition, the inner side of the battery cover 250 is the plastic inner housing 252, and the complex internal structure design is easily made on the plastic inner housing 252. This avoids the problem that it is difficult to make the internal structure design on the ceramic outer housing 251 with the relatively high hardness. In this embodiment of this application, because an outer side of the battery cover 250 is the ceramic outer housing 251, an all-ceramic outer housing of the electronic device is implemented without the weight of the electronic device increasing, and this meets both a high-quality feeling and high hardness of the battery cover 250 of the electronic device.

Figure 13:
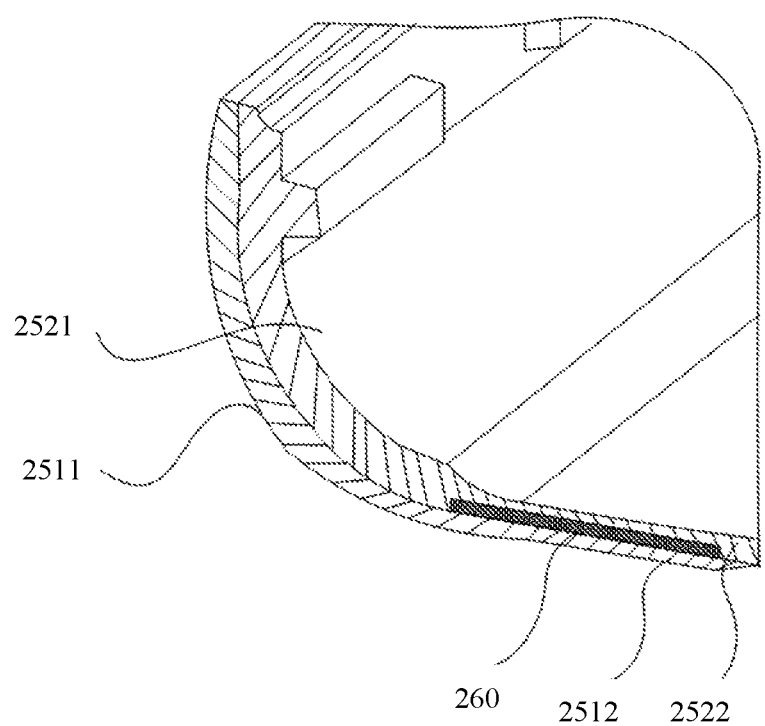
FIG. 13 is a schematic diagram of a partial cross-section structure of a battery cover and an antenna radiator of an electronic device according to an embodiment of this application.
Figure 14:
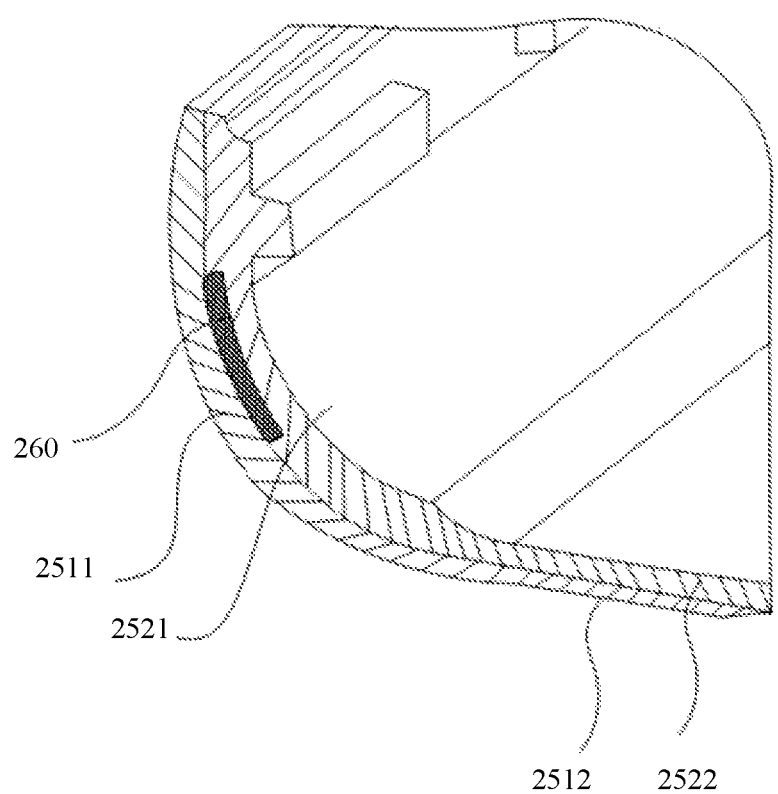
FIG. 14 is another schematic diagram of a partial cross-section structure of a battery cover and an antenna radiator of an electronic device according to an embodiment of this application.

In a possible implementation, an antenna may be disposed in the electronic device. In this embodiment of this application, a radiator of the antenna may be disposed between the ceramic outer housing 251 and the plastic inner housing 252. For example, as shown in FIG. 13, at least one antenna radiator 260 may be disposed between the outer bottom housing 2512 of the ceramic outer housing 251 and the inner bottom housing 2522 of the plastic inner housing 252. Alternatively, as shown in FIG. 14, the at least one antenna radiator 260 may be disposed between the outer side housing 2511 of the ceramic outer housing 251 and the inner side housing 2521 of the plastic inner housing 252. Alternatively, the at least one antenna radiator 260 may be disposed both between the outer bottom housing 2512 of the ceramic outer housing 251 and the inner bottom housing 2522 of the plastic inner housing 252, and between the outer side housing 2511 of the ceramic outer housing 251 and the inner side housing 2521 of the plastic inner housing 252.

In this embodiment of this application, a clearance of the antenna radiator 260 may be less than 10 mm. For example, the clearance of the antenna radiator 260 may be 5 mm. Impedance of the antenna radiator 260 may be less than 5 SI For example, the impedance of the antenna radiator 260 may be 1 SI For a quantity and positions of the antenna radiators 260 disposed between the plastic inner housing 252 and the ceramic outer housing 251, refer to the description in the foregoing scenario 2. In this embodiment, types of the antenna and the quantity of the antenna radiators 260 disposed between the plastic inner housing 252 and the ceramic outer housing 251 are not limited. For example, a primary antenna, a MIMO antenna, a Wi-Fi antenna, a Bluetooth antenna, a GPS antenna, and a diversity antenna may be disposed. For an operating frequency band of each antenna, refer to the description in the foregoing scenario 2. Details are not described again in this embodiment.

In this embodiment of this application, when the antenna radiator 260 is disposed, and when the battery cover 250 is manufactured, for example, before the plastic injection molding is performed on the inner surface of the ceramic outer housing 251, the method further includes: disposing the antenna radiator 260 on the inner surface of the ceramic outer housing 251 (for example, an inner surface of the outer bottom housing 2512 or an inner surface of the outer side housing 2511), and performing the plastic injection molding on the inner surface of the ceramic outer housing 251 on which the antenna radiator 260 is disposed. After the injection molding is completed, the antenna radiator 260 is injection molded between the ceramic outer housing 251 and the plastic inner housing 252.

In the descriptions of the embodiments of this application, it should be noted that, unless otherwise clearly specified and limited, terms "assemble", "connect", and "connect" should be understood in a broad sense. For example, the terms may be used for a fixed connection, a connection through intermediate media, an internal connection between two elements, or an interaction relationship between two elements. Persons of ordinary skill in the art may understand specific meanings of the terms in the embodiments of this application based on specific cases.

In the specification, claims, and accompanying drawings of embodiments of this application, the terms "first", "second", "third", "fourth", and so on (if existent) are intended to distinguish between similar objects but do not necessarily indicate a specific order or sequence.

Finally, it should be noted that the foregoing embodiments are merely intended for describing the technical solutions in the embodiments of this application other than limiting this application. Although the embodiments of this application are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A middle frame, wherein the middle frame comprises:
a metal middle plate and an edge frame disposed around an outer edge of the metal middle plate, wherein
the edge frame comprises a plastic frame and a ceramic frame disposed on an outer side surface of the plastic frame, wherein the plastic frame and the ceramic frame are integrally formed; and
the middle frame further comprises at least one antenna, wherein the antenna comprises an antenna radiator, a feeding point, and a grounding point, wherein the feeding point and the grounding point are electrically connected to the antenna radiator, and the antenna radiator is disposed between the plastic frame and the ceramic frame.

2. The middle frame according to claim 1, wherein a clearance of the antenna is less than 10 mm, or, an impedance of the antenna is less than or equal to 5Ω.

3. The middle frame according to claim 1, wherein the middle frame comprises a plurality of antennas comprising antenna radiators, and the antenna radiators of the plurality of antennas are spaced between the ceramic frame and the plastic frame, wherein each of the plurality of antennas comprise at least one or more of a primary antenna, a diversity antenna, a Wi-Fi antenna, a GPS antenna, a multiple-input multiple-output (MIMO), antenna, and a Bluetooth antenna.

4. The middle frame according to claim 1, wherein the ceramic frame is a gapless ceramic frame; or the ceramic frame comprises a plurality of ceramic sub-frames, and the plurality of ceramic sub-frames are connected to form the ceramic frame in a ring shape.

5. A battery cover, comprising a ceramic outer housing and a plastic inner housing, wherein the plastic inner housing is disposed on an inner surface of the ceramic outer housing, wherein the plastic inner housing is formed on the inner surface of the ceramic outer housing;
wherein the battery cover comprises a bottom cover and a side cover, and the side cover is disposed around an outer edge of the bottom cover;
wherein the ceramic outer housing comprises an outer bottom housing and an outer side housing disposed around an outer edge of the outer bottom housing, wherein the outer bottom housing and the outer side housing are integrally formed; and
the plastic inner housing comprises an inner bottom housing and an inner side housing, wherein the inner bottom housing and the inner side housing are integrally formed; and
the outer bottom housing and the inner bottom housing form the bottom cover, and the outer side housing and the inner side housing form the side cover.

6. The battery cover according to claim 5, wherein a thickness of the bottom cover of the battery cover is 0.45-0.9 mm.

7. The battery cover according to claim 5, wherein a thickness of the outer bottom housing of the ceramic outer housing is 0.2-0.6 mm.

8. The battery cover according to claim 5, further comprising at least one antenna, wherein the antenna comprises an antenna radiator, a feeding point, and a grounding point, wherein the feeding point and the grounding point are electrically connected to the antenna radiator, and the antenna radiator is disposed between the ceramic outer housing and the plastic inner housing.

9. The battery cover according to claim 8, wherein the antenna radiator is located between the outer bottom housing of the ceramic outer housing and the inner bottom housing of the plastic inner housing, or the antenna radiator is located between the outer side housing of the ceramic outer housing and the inner side housing of the plastic inner housing.

10. The battery cover according to claim 5, wherein a ceramic strength of the ceramic outer housing is 300-1700 MPa, and a ceramic fracture toughness is 2-16 MPa-m1/2.

11. The battery cover according to claim 5, wherein a plastic bending modulus of the plastic inner housing is greater than or equal to 1000 MPa.

12. The battery cover according to claim 5, wherein a material of the ceramic outer housing comprises zirconia ceramics, silicon carbide ceramics, silicon nitride ceramics, aluminum nitride ceramics, or aluminum oxide ceramics; and a material of the plastic inner housing comprises polycarbonate (PC) plastic alloy, polyamide (PA) or polybutylene terephthalate (PBT).

13. The battery cover according to claim 5, wherein the plastic inner housing comprises a reinforcing material within the plastic inner housing, and the reinforcing material comprises one or more of glass fiber, carbon fiber, and graphene.

14. An electronic device, comprising at least a display screen and a battery cover, wherein the display screen is connected to the battery cover to enclose accommodation space used to accommodate a component;

wherein the battery cover, comprising a ceramic outer housing and a plastic inner housing, wherein the plastic inner housing is disposed on an inner surface of the ceramic outer housing, wherein the ceramic outer housing and the plastic inner housing are integrally formed;

wherein the battery cover comprises a bottom cover and a side cover, and the side cover is disposed around an outer edge of the bottom cover;

wherein the ceramic outer housing comprises an outer bottom housing and an outer side housing disposed around an outer edge of the outer bottom housing, wherein the outer bottom housing and the outer side housing are integrally formed; and the plastic inner housing comprises an inner bottom housing and an inner side housing, wherein the inner bottom housing and the inner side housing are integrally formed; and the outer bottom housing and the inner bottom housing form the bottom cover, and the outer side housing and the inner side housing form the side cover.

15. The electronic device according to claim 14, wherein a thickness of the bottom cover of the battery cover is 0.45-0.9 mm.

16. The electronic device according to claim 14, wherein a thickness of the outer bottom housing of the ceramic outer housing is 0.2-0.6 mm.

17. The electronic device according to claim 14, further comprising at least one antenna, wherein the antenna comprises an antenna radiator, a feeding point, and a grounding point, wherein the feeding point and the grounding point are electrically connected to the antenna radiator, and the antenna radiator is disposed between the ceramic outer housing and the plastic inner housing.

18. The electronic device according to claim 17, wherein the antenna radiator is located between the outer bottom housing of the ceramic outer housing and the inner bottom housing of the plastic inner housing, or the antenna radiator is located between the outer side housing of the ceramic outer housing and the inner side housing of the plastic inner housing.

19. The electronic device according to claim 14, wherein a ceramic strength of the ceramic outer housing is 300-1700 MPa, and a ceramic fracture toughness is 2-16 MPa·m1/2.

20. The electronic device according to claim 14, wherein a plastic bending modulus of the plastic inner housing is greater than or equal to 1000 MPa.

\* \* \* \* \*